United States Patent
Sung et al.

(10) Patent No.: US 12,198,675 B2
(45) Date of Patent: *Jan. 14, 2025

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Hosang Sung, Suwon-si (KR); Kyoungbo Min, Suwon-si (KR); Seonho Hwang, Suwon-si (KR); Doohwa Hong, Seoul (KR); Eunmi Oh, Suwon-si (KR); Jonghoon Jeong, Suwon-si (KR); Kihyun Choo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 35 days.

This patent is subject to a terminal disclaimer.

(21) Appl. No.: 18/171,079

(22) Filed: Feb. 17, 2023

(65) Prior Publication Data

US 2023/0206897 A1 Jun. 29, 2023

Related U.S. Application Data

(63) Continuation of application No. 16/788,418, filed on Feb. 12, 2020, now Pat. No. 11,587,547.

(30) Foreign Application Priority Data

Feb. 28, 2019 (KR) .......................... 10-2019-0024192

(51) Int. Cl.
*G10L 15/26* (2006.01)
*G10L 13/00* (2006.01)
(Continued)

(52) U.S. Cl.
CPC .............. *G10L 13/08* (2013.01); *G10L 13/00* (2013.01); *G10L 13/047* (2013.01); *G10L 17/00* (2013.01); *G10L 25/63* (2013.01)

(58) Field of Classification Search
None
See application file for complete search history.

(56) References Cited

U.S. PATENT DOCUMENTS 5,905,970 A * 5/1999 Aoyagi .................. G10L 19/08
704/211
6,081,780 A 6/2000 Lumelsky
(Continued)

FOREIGN PATENT DOCUMENTS

CN 1366659 A 8/2002
CN 101183525 A 5/2008
(Continued)

OTHER PUBLICATIONS

Communication dated Nov. 3, 2023, issued by the China National Intellectual Property Administration in Chinese Application No. 202080017465.1.

(Continued)

*Primary Examiner* — Shreyans A Patel
(74) *Attorney, Agent, or Firm* — Sughrue Mion, PLLC

(57) ABSTRACT

An electronic apparatus which acquires input data to be input into a TTS module for outputting a voice through the TTS module, acquires a voice signal corresponding to the input data through the TTS module, detects an error in the acquired voice signal based on the input data, corrects the input data based on the detection result, and acquires a corrected voice signal corresponding to the corrected input data through the TTS module.

20 Claims, 19 Drawing Sheets

(51) Int. Cl.
  *G10L 13/047* (2013.01)
  *G10L 13/08* (2013.01)
  *G10L 17/00* (2013.01)
  *G10L 25/63* (2013.01)

(56) References Cited

U.S. PATENT DOCUMENTS

| | | | |
|---|---|---|---|
| 6,246,672 B1 | 6/2001 | Lumelsky | |
| 6,477,495 B1* | 11/2002 | Nukaga | G10L 13/10 |
| | | | 704/260 |
| 9,245,521 B2 | 1/2016 | Park et al. | |
| 9,275,633 B2 | 3/2016 | Cath et al. | |
| 9,293,129 B2 | 3/2016 | Zhao et al. | |
| 9,576,574 B2 | 2/2017 | van Os | |
| 9,978,359 B1* | 5/2018 | Kaszczuk | G10L 13/02 |
| 10,008,196 B2 | 6/2018 | Maisonnier et al. | |
| 10,276,149 B1* | 4/2019 | Liang | G10L 13/033 |
| 10,643,600 B1* | 5/2020 | Aryal | G10L 13/033 |
| 11,587,547 B2* | 2/2023 | Sung | G10L 13/00 |
| 2001/0025242 A1 | 9/2001 | Joncour | |
| 2002/0111794 A1* | 8/2002 | Yamamoto | G10L 17/26 |
| | | | 704/E15.041 |
| 2005/0228672 A1* | 10/2005 | Lewis | G10L 21/04 |
| | | | 704/260 |
| 2006/0149546 A1* | 7/2006 | Runge | G10L 15/26 |
| | | | 704/E15.045 |
| 2007/0027686 A1* | 2/2007 | Schramm | G10L 13/00 |
| | | | 704/235 |
| 2008/0091426 A1 | 4/2008 | Rempel et al. | |
| 2008/0183473 A1* | 7/2008 | Nagano | G10L 13/07 |
| | | | 704/E13.011 |
| 2009/0043583 A1* | 2/2009 | Agapi | G10L 13/04 |
| | | | 704/260 |
| 2009/0299733 A1* | 12/2009 | Agapi | G10L 15/26 |
| | | | 704/E15.005 |
| 2010/0005362 A1 | 1/2010 | Ito et al. | |
| 2012/0035917 A1* | 2/2012 | Kim | G10L 13/033 |
| | | | 704/E19.001 |
| 2014/0019127 A1 | 1/2014 | Park et al. | |
| 2014/0257815 A1* | 9/2014 | Zhao | G10L 13/086 |
| | | | 704/260 |
| 2015/0205779 A1 | 7/2015 | Bak et al. | |
| 2016/0294739 A1 | 10/2016 | Stoehr et al. | |
| 2017/0269975 A1* | 9/2017 | Wood | G10L 15/1815 |
| 2017/0270086 A1* | 9/2017 | Fume | G10L 15/26 |
| 2017/0352346 A1* | 12/2017 | Paulik | G10L 15/07 |
| 2018/0211652 A1 | 7/2018 | Mun et al. | |
| 2018/0336882 A1* | 11/2018 | Reber | G06F 18/2135 |
| 2019/0295527 A1* | 9/2019 | Pore | G06F 40/263 |
| 2020/0051545 A1* | 2/2020 | Iwase | G10L 25/84 |
| 2020/0279551 A1* | 9/2020 | Sung | G10L 13/08 |
| 2023/0206897 A1* | 6/2023 | Sung | G06F 40/151 |
| | | | 704/235 |

FOREIGN PATENT DOCUMENTS

| | | | | |
|---|---|---|---|---|
| CN | 103366731 A | | 10/2013 | |
| CN | 103546787 A | | 1/2014 | |
| CN | 108288464 A | * | 7/2018 | G10L 13/033 |
| CN | 109461435 A | * | 3/2019 | G10L 13/02 |
| CN | 109979427 A | | 7/2019 | |
| CN | 110600002 A | | 12/2019 | |
| JP | 2003-108170 A | | 4/2003 | |
| JP | 2018-109663 A | | 7/2018 | |
| KR | 10-0918644 B1 | | 9/2009 | |
| KR | 10-1221188 A | | 1/2013 | |
| KR | 10-2016-0080711 A1 | | 7/2016 | |

OTHER PUBLICATIONS

Communication issued Mar. 28, 2023 by the Korean Intellectual Property Office in Korean Patent Application No. 10-2019-0024192.

Communication issued May 11, 2023 by the European Patent Office in European Patent Application No. 20763060.9.

Communication issued Oct. 25, 2021 by the European Patent Office in counterpart European Patent Application No. 20763060.9.

International Search Report dated May 13, 2020 issued by the International Searching Authority in counterpart International Application No. PCT/KR2020/001581 (PCT/ISA/210).

International Written Opinion dated May 13, 2020 issued by the International Searching Authority in counterpart International Application No. PCT/KR2020/001581 (PCT/ISA/237).

* cited by examiner

ELECTRONIC APPARATUS AND METHOD FOR CONTROLLING THEREOF

CROSS-REFERENCE TO RELATED APPLICATION(S)

This is a continuation of U.S. application Ser. No. 16/788,418 filed on Feb. 12, 2020, which is based on and claims priority under 35 U.S.C. § 119 (a) from Korean Patent Application No. 10-2019-0024192, filed on Feb. 28, 2019, in the Korean Intellectual Property Office, the disclosures of which are incorporated by reference herein in their entireties.

BACKGROUND

1. Field

The disclosure relates to an electronic apparatus and a method for controlling thereof, and more particularly, to an electronic apparatus which is capable of implementing a more precise and natural conversation system and a method for controlling thereof.

2. Description of Related Art

Recently, artificial intelligence systems are being used in various fields. An artificial intelligence system is a system in which a machine learns, determines, and iteratively improves analysis and decision making, unlike conventional rule-based smart systems. An artificial intelligence system shows a more improved recognition rate as the artificial intelligence system iteratively operates, and for example becomes capable of understanding user preference more correctly. For this reason, conventional rule-based smart systems are gradually being replaced by deep learning-based artificial intelligence systems.

Recently, various services using artificial intelligence agents providing a response to voice input of a user (e.g., Bixby™, Assistant™, Alexa™, etc.) are being provided. In particular, with the introduction of neural text-to-speech (TTS) technologies, a relation between an input text and an acoustic characteristic may be integrally modeled, and a synthesized voice, which is natural on the whole, may be output.

However, in case training data is not sufficient for training, an error for a text may occur in the process of voice synthesis. In case an utterance error occurred, it may not be possible to directly correct the parameter of a TTS model. Thus, in the process of a lightweight model for implementation in a device, etc., degradation in sound quality and occurrence of errors increase.

Accordingly, there is a need for a technology for recognizing and correcting an error in case a voice, which is different from a response intended at a natural language processing part, is uttered due to an operation error at a voice synthesis part (text to speech).

SUMMARY

The disclosure was designed according to the aforementioned need, and the purpose of the disclosure is in providing an electronic apparatus capable of implementing a more precise and natural conversation system by detecting and correcting an error in a voice signal output at a TTS module, and a method for controlling thereof.

According to an embodiment, there is provided an electronic apparatus including a memory including at least one instruction, and a processor which executes at least one instruction stored in the memory and controls the electronic apparatus. The processor when executing the at least one instruction may be configured to acquire input data to be input into a text-to-speech (TTS) module for outputting a voice through the TTS module, acquire a voice signal corresponding to the input data through the TTS module, detect an error in the voice signal based on the input data, correct the input data based on a result of detecting the error, and acquire a corrected voice signal corresponding to the input data corrected based on the result of detecting the error through the TTS module.

In this case, the input data may include first text data, and the processor may convert the voice signal into second text data, and compare the first text data included in the input data and the second text data and detect the error in the voice signal based on a result of comparing the first text data and the second text data.

Meanwhile, the input data may include data related to emotions, and the processor may identify an emotion of the voice signal based on a frequency characteristic of the voice signal, and compare the data related to emotions included in the input data and the emotion and detect the error in the voice signal based on a result of comparing the data related to emotions included in the input data and the emotion.

Also, the processor may compare a length of the voice signal and a length of text data included in the input data and detect the error in the voice signal based on a result of comparing the length of the voice signal and the length of the text data included in the input data.

Meanwhile, the processor may, based on detecting the error in the voice signal, correct at least one of a spacing or a punctuation mark of text data included in information on the input data, and input corrected input data having the at least one of the spacing or the punctuation mark of the text data into the TTS module.

Also, the processor may, based on detecting the error in the voice signal, correct the input data by applying a speech synthesis markup language (SSML) to text data included in the input data, and input corrected input data having the speech synthesis markup language (SSML) applied to the text data into the TTS module.

Meanwhile, the processor may convert a received user voice into text data by using a voice recognition module, and analyze an intent of the text data and acquire response information corresponding to the received user voice as the input data.

Meanwhile, the electronic apparatus according to an embodiment of the disclosure may further include a speaker, and the processor may add an indicator indicating correction to the voice signal and output the voice signal having the indicator through the speaker.

Also, the electronic apparatus according to an embodiment of the disclosure may further include a speaker and a microphone, and the processor may output the voice signal through the speaker, and based on the voice signal output through the speaker being received through the microphone, detect the error in the voice signal received through the microphone based on the input data.

In this case, the processor may identify an identity of the voice signal received through the mic. Also, the processor may, based on the voice signal received through the microphone being a voice signal output through the speaker based on the identity, detect the error in the voice signal, and based on the voice signal received through the microphone having been uttered by a user based on the identity, convert the voice signal into text data by using a voice recognition module, and analyze an intent of the text data and acquire response information corresponding to the received user voice as the input data.

Meanwhile, the electronic apparatus according to an embodiment of the disclosure may further include a communicator, and the processor may transmit the voice signal to an external apparatus through the communicator.

According to an embodiment, there is provided a method of controlling an electronic apparatus including the steps of acquiring input data to be input into a TTS module for outputting a voice through the TTS module, acquiring a voice signal corresponding to the input data through the TTS module, detecting an error in the voice signal based on the input data, correcting the input data based on a result of the detecting the error, and acquiring a corrected voice signal corresponding to the input data corrected based on the result of detecting the error through the TTS module.

In this case, the input data may include text data, and the step of detecting an error may include the steps of converting the voice signal into second text data and comparing the first text data included in the input data and the second text data and detecting an error in the voice signal based on a result of the comparing the first text data and the second text data.

Meanwhile, the input data may include data related to emotions, and the step of detecting an error may include the steps of identifying an emotion of the voice signal based on a frequency characteristic of the voice signal, and comparing the data related to emotions included in the input data and the emotion and detecting the error in the voice signal based on a result of comparing the data related to emotions included in the input data and the emotion.

Also, the step of detecting an error may include comparing a length of the voice signal and a length of text data included in the input data and detecting the error in the voice signal based on a result of comparing the length of the voice signal and the length of the text data included in the input data.

Meanwhile, the correcting step may include based on detecting the error in the voice signal, correcting at least one of a spacing or a punctuation mark of text data included in the input data and inputting corrected input data having the at least one of the spacing or the punctuation mark of the text data into the TTS module.

Also, the correcting step may include based on detecting the error in the voice signal, correcting the input data by applying a speech synthesis markup language (SSML) to text data included in the input data and inputting corrected input data having the speech synthesis markup language (SSML) applied to the text data into the TTS module.

Meanwhile, in the step of acquiring input data, a received user voice may be converted into text data by using a voice recognition module, and the intent of the text data may be analyzed and response information corresponding to the user voice may be acquired as the input data.

Also, the method for controlling an electronic apparatus according to an embodiment of the disclosure may further include the step of adding an indicator informing of correction to the corrected voice signal and outputting the signal through a speaker.

Meanwhile, the method for controlling an electronic apparatus according to an embodiment of the disclosure may further include the step of outputting the acquired voice signal through a speaker. Also, the step of detecting an error may include the steps of receiving the voice signal output through the speaker through a microphone and detecting an error in the voice signal received through the microphone based on the input data.

DETAILED DESCRIPTION

Figure 1:
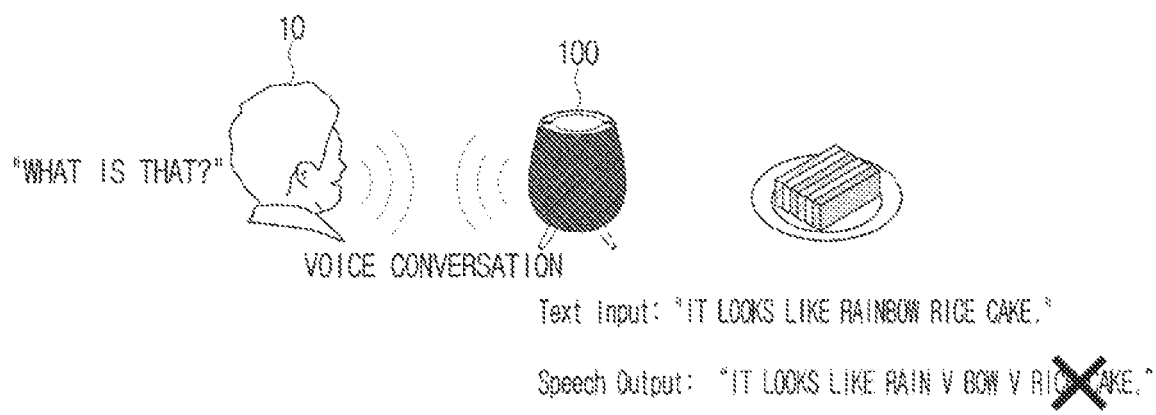
FIG. 1 is a diagram illustrating an example of usage of an electronic apparatus according to an embodiment of the disclosure.

Hereinafter, embodiments of the disclosure will be described in detail.

As terms used in the embodiments of the disclosure, general terms that are currently used widely were selected as far as possible, in consideration of the functions described in the disclosure. However, the terms may vary depending on the intent of those skilled in the art who work in the pertinent field or emergence of new technologies. Also, in particular instances, there may be terms that are designated, and in such cases, the meaning of the terms will be described in detail in the relevant descriptions in the disclosure. Thus, the terms used in the disclosure should be defined based on the meaning of the terms and the overall content of the disclosure, and not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. Meanwhile, in describing the embodiments, detailed explanation of related conventional technologies may unnecessarily obscure the gist of the disclosure, and such detailed explanation will be omitted.

The terms "first," "second" and the like used in the disclosure may be used to describe various elements, but the terms are not intended to limit the elements. Such terms are used only to distinguish one element from another element.

Singular expressions include plural expressions as long as not indicated differently in the context. Also, in this specification, terms such as "include" and "consist of" should be construed as designating that there are such characteristics, numbers, steps, operations, elements, components or a combination thereof in the specification, but not to exclude in advance the existence or possibility of adding one or more of other characteristics, numbers, steps, operations, elements, components or a combination thereof.

In addition, the terms 'a module' or 'a part' used in the embodiments of the disclosure are for referring to elements performing at least one function or operation, and these elements may be implemented as hardware or software, or as a combination of hardware and software. Further, a plurality of 'modules' or 'parts' may be integrated into at least one module and implemented as at least one processor, except 'modules' or 'parts' that need to be implemented as specific hardware.

Hereinafter, the embodiments of the disclosure will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly, and throughout the specification, similar components were designated by similar reference numerals.

Hereinafter, the disclosure will be described in more detail with reference to the accompanying drawings.

FIG. 1 is a diagram illustrating an example of usage of an electronic apparatus according to an embodiment of the disclosure.

Referring to FIG. 1, the electronic apparatus 100 may receive voice input of a user inquiry from a user 10. Here, the electronic apparatus 100 may receive input of a user inquiry through a voice of the user, as illustrated in FIG. 1. However, this is merely an example, and the electronic apparatus 100 may receive input of a user inquiry through various input methods such as touch input and keyboard input.

Here, in FIG. 1, the electronic apparatus 100 is illustrated as an artificial intelligence speaker. However, the disclosure is not limited thereto, and the electronic apparatus 100 may be implemented as a smartphone, a desktop PC, a laptop PC, a netbook computer, a server, a PDA, a PMP, a medical device, a camera, a TV, a refrigerator, an air conditioner, a cleaner, an oven, a washing machine, an air purifier, a set-top box, a home automation control panel, a security control panel, a media box (e.g.: Samsung HomeSync™, Apple TV™, or Google TV™), a game console (e.g.: Xbox™, PlayStation™), a kiosk, and a wearable device (a watch, a ring, a bracelet, an ankle bracelet, a necklace, glasses, a contact lens, or a head-mounted-device (HMD), clothing, a skin pad), etc.

The electronic apparatus 100 may receive input of a user voice including a trigger word for activating or waking up an artificial intelligence agent to receive input of a user inquiry via the voice of the user. For example, the electronic apparatus 100 may receive input of a user voice including a trigger word such as "Hi, Bixby" before receiving input of a user inquiry. When a user voice including a trigger word is detected, the electronic apparatus 100 may wake up, execute or activate an artificial intelligence agent, and detect input of a user inquiry. The artificial intelligence agent may include a conversation system and associated programming that can process a user inquiry in the voice of a user and provide an audible output as a response in a natural language form.

As an example, the electronic apparatus 100 may receive input of a user voice "What is that?" from the user 10. Here, the electronic apparatus 100 may analyze the intent of the user voice and acquire input data, to generate a response including "It looks like rainbow rice cake," as a response text. Here, the electronic apparatus 100 may acquire a response to an inquiry detected in a user voice by additionally using context information acquired through a sensor and a camera.

Meanwhile, the electronic apparatus 100 may acquire a voice signal by receiving input data and processing the voice signal using a text to speech (TTS) module. The electronic apparatus 100 may output an acquired voice signal through a speaker. In case a response voice output through a speaker may be "It looks like a rainbow rice cake," a response which is different from the intent of the user, and thus confusion might be caused to the user owing to a mismatch or disconnect between the intent of the inquiry and the output provided by the electronic apparatus 100.

Meanwhile, in FIG. 1, it is illustrated that the electronic apparatus 100 outputs a response voice for a user voice, but the disclosure may be applied when voice output according to input of a user manipulation is performed. For example, in case a user performed a 'reading a book' function when using an electronic book application, the electronic apparatus 100 may perform voice synthesis of the stored text of an electronic book by using a TTS module, and output the synthesized voice.

According to the disclosure, the electronic apparatus 100 may detect an error in a voice signal output from a TTS module, and output a corrected voice signal. Thereby, the electronic apparatus 100 may implement a more precise and natural conversation system. Specific error detection operations and correction operations of a voice signal will be described in detail with reference to FIGS. 2 to 19.

Figure 2:
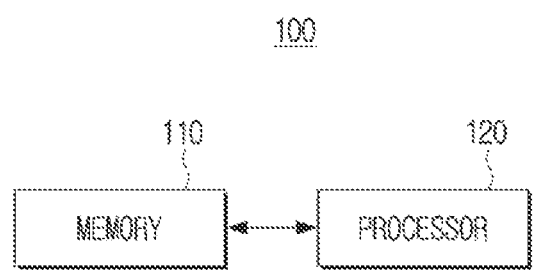
FIG. 2 is a block diagram illustrating a schematic configuration of an electronic apparatus according to an embodiment of the disclosure.

FIG. 2 is a block diagram illustrating a schematic configuration of an electronic apparatus according to an embodiment of the disclosure.

Referring to FIG. 2, the electronic apparatus 100 includes a memory 110 and a processor 120.

The memory 110 may store various types of programs and data necessary for the operation of the electronic apparatus 100. Specifically, the memory 110 may store software programs or applications including computer-readable instructions for providing at least one instruction to the processor 120. The processor 120 may control the electronic apparatus 100 to perform operations by executing the software stored in the memory 110. The memory 110 may be implemented as a nonvolatile memory, a volatile memory, a flash memory, a hard disk drive (HDD), or a solid state drive (SSD), etc. The memory 110 may be accessed by the processor 120, and reading/recording/correction/deletion/update, etc. of data by the processor 120 may be performed. In the disclosure, the term memory may include the memory 110, ROM and RAM inside the processor 120, or a memory card mounted on the electronic apparatus 100 (e.g., a micro SD card, a memory stick). Also, in the memory 110, programs and data for constituting and causing various screens to be displayed in a display area of a display of the electronic apparatus may be stored.

Also, the memory 110 may store an artificial intelligence model for implementation in a conversation system. Specifically, the electronic apparatus 100 may implement an artificial intelligence agent for generating a natural language as a response to an inquiry in a user utterance. Here, an artificial intelligence agent may be a dedicated program for providing artificial intelligence based services (e.g., a voice recognition service, an agent service, a translation service, a search service, etc.). In particular, an artificial intelligence model may be executed by a conventional generic-purpose processor (e.g., a CPU) or a separate AI-dedicated processor (e.g., a GPU, etc.).

Figure 4:
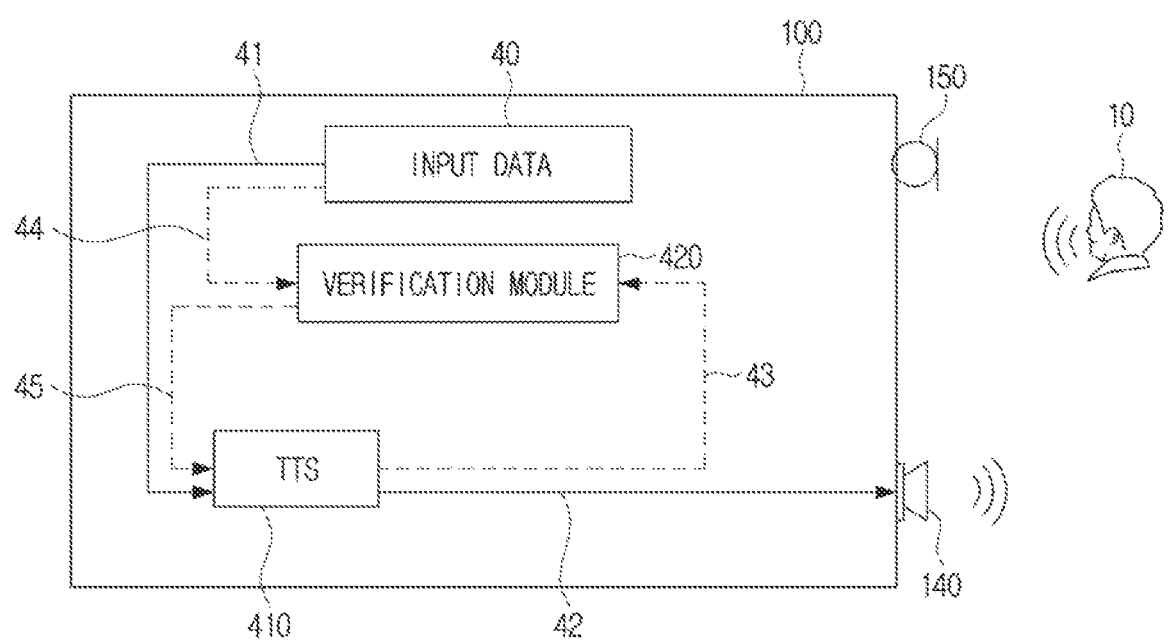
FIG. 4 is a diagram illustrating an electronic apparatus verifying a TTS module according to an embodiment of the disclosure.
Figure 7:
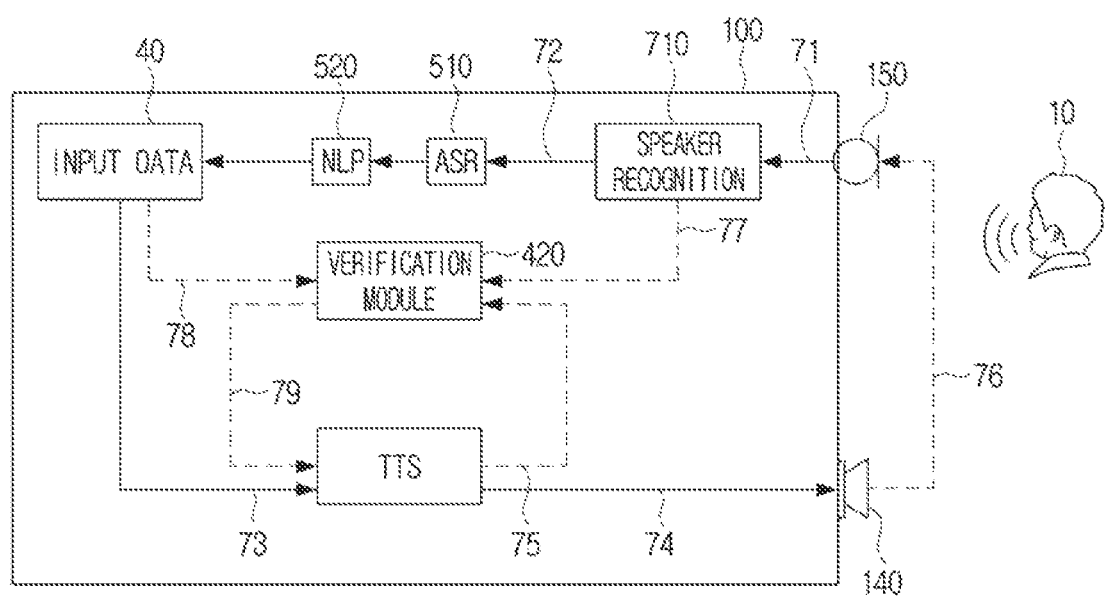
FIG. 7 is a diagram illustrating an electronic apparatus verifying a TTS module according to an embodiment of the disclosure.

In addition, the memory 110 may include a plurality of components (or software modules) as illustrated in FIGS. 4 and 7.

The processor 120 may be electronically connected with the memory 110 and control the overall operations of the electronic apparatus 100. Specifically, the processor 120 may execute at least one instruction of software programs or applications stored in the memory 110 and thereby control the electronic apparatus 100 to perform functions described in the disclosure.

According to an embodiment of the disclosure, the processor 120 may be implemented as a digital signal processor (DSP), a microprocessor, and a time controller (TCON). However, the disclosure is not limited thereto, and the processor 120 may include one or more of a central processing unit (CPU), a micro controller unit (MCU), a micro processing unit (MPU), a controller, an application processor (AP) or a communication processor (CP), and an ARM processor, or may be defined by the terms. Also, the processor 120 may be implemented as a system on chip (SoC) having a processing algorithm stored therein or large scale integration (LSI), or in the form of a field programmable gate array (FPGA).

The processor 120 of the electronic apparatus 100 of the disclosure may convert a received user voice into a text by using a voice recognition module. The voice recognition module may include a speech-to-text module. Here, the electronic apparatus 100 may receive a user voice from an external apparatus through a communicator (130 in FIG. 3), or may directly receive input of a user voice by a microphone (150 in FIG. 3) provided. Here, the external apparatus may be at least one of an edge device and an ambient device (ambience dot). Hereinafter, modules used in a conversation system will be described by their functions and described as a plurality of modules, and several modules may be implemented as one module, and such a module may be in the form of software, may be implemented in the form of one or more dedicated hardware chips, or may be implemented in any combination of software and hardware.

Specifically, the processor 120 may convert a received user voice into a text by using an automatic speech recognition (ASR) module, which may be one of the voice recognition modules.

An automatic speech recognition (ASR) module may convert an input user voice (in particular, a user inquiry) into text data. For example, an automatic speech recognition module may include an utterance recognition module. The utterance recognition module may include an acoustic model and a language model. For example, an acoustic model may include information related to voicing, and a language model may include information on combination of unit phoneme information and the unit phoneme information. An utterance recognition module may convert a user utterance into text data by using information related to voicing and information on unit phoneme information. Information on an acoustic model and a language model, may be stored, for example, in an automatic speech recognition database (ASR DB).

Also, the processor 120 may analyze the intent of a converted text and acquire information on a response voice responding to a user voice. Here, the processor 120 may perform analysis of the intent of the text and acquire response information corresponding thereto by using a natural language processing (NLP) module. Here, a natural language processing module may include a natural language understanding (NLU) module, a dialogue manager (DM) module, a natural language generator (NLG) module, etc.

Here, a natural language understanding module may identify a user intent by performing syntactic analysis or sematic analysis. In syntactic analysis, a user input may be divided into grammatical units (e.g.: words, phrases, morphemes, etc.), and different kinds of syntactic elements among the divided units may be determined or identified. Semantic analysis may be performed by using semantic matching, rule matching, formula matching, etc. Accordingly, a natural language understanding module may acquire a domain, an intent, or a parameter (or, a slot) necessary for expressing an intent of a user input.

A natural language understanding module may determine a user intent and a parameter by using matching rules divided into a domain, an intent, and a parameter (or, a slot) necessary for understanding an intent. For example, the one domain (e.g.: a notification) may include a plurality of intents (e.g.: setting of a notification, release of a notification, etc.), and one intent may include a plurality of parameters (e.g.: time, the number of repetition, a notification sound, etc.). A plurality of rules may include, for example, one or more essential element parameters. Matching rules may be stored in a natural language understanding database (NLU DB).

Also, a natural language understanding module may identify the meaning of a word extracted from a user input by using linguistic characteristics (e.g.: syntactic elements) such as phonemes and phrases, and match the identified meaning of the word with the domain and the intent, and thereby determine the user intent. For example, a natural language understanding module may calculate how many words extracted from a user input are included in each domain and intent, and determine the user intent. According to an embodiment of the disclosure, a natural language understanding module may determine the parameter of a user input by using a word forming a basis for understanding the intent. Also, according to an embodiment of the disclosure, a natural language understanding module may determine a user intent by using a natural language recognition database storing language characteristics for understanding the intent of a user input.

A conversation manager module may determine whether a user intent identified by a natural language understanding module is clear. For example, a conversation manager module may determine whether a user intent is clear based on whether information on the parameter is sufficient. Also, a conversation manager module may determine whether the parameter identified from a natural language understanding module is sufficient for performing a task. According to an embodiment of the disclosure, a conversation manager module may perform a feedback requesting necessary information to a user in case the user intent is unclear. For example, a conversation manager module may perform a feedback requesting information on a parameter for understanding a user intent. Also, a conversation manager module may generate a message for checking a user inquiry including a text changed by a natural language understanding module and output the message.

According to an embodiment of the disclosure, a conversation manager module may include a content provider module. In case a content provider module performs operations based on an intent and a parameter identified from a natural language understanding module, the content provider module may generate a result of performing a task corresponding to a user input.

According to an embodiment of the disclosure, a conversation manager module may provide a response to a user inquiry by using a knowledge database. Here, the knowledge database may be included inside the electronic apparatus 100, but the locally stored database is merely an example, and the knowledge database may be included in an external server. Specifically, a conversation manager module may acquire information on a response voice responding to a user voice based on the analyzed intent of the user voice. Here, information on a response voice may include text information on the content of the response and emotion information corresponding to the content of the response. Here, emotional information may include voice tone information, style information, prosody information, etc.

A natural language generation module (an NLG module) may change designated information in the form of a text. The information changed to a text form may be in the form of natural language utterance. The designated information may be, for example, information on an additional input, information guiding completion of an operation corresponding to a user input, or information guiding an additional input of a user (e.g.: information on a feedback for a user input). The information changed to a text form may be converted into a voice form by a text voice conversion module (a TTS module).

The text voice conversion module (TTS module) may convert information in a text form included in input data to be input into the TTS module into a voice signal. The TTS module may receive information in a text form from a natural language generation module, and convert the information in a text form into information in a voice form, and output the information.

As described above, input data input into a TTS module may be a response acquired by analyzing an input user voice. Meanwhile, according to another embodiment of the disclosure, input data may be pre-stored in the memory 110 like an electronic book, or it may be text data received from an external server. Here, the processor 120 may input the pre-stored or received input data into a TTS module and acquire a voice signal corresponding to the input data.

For the convenience of explanation, hereinafter, both of information on a response voice acquired by analyzing a user voice, and pre-stored or received text data will be referred to as 'input data' to be input into a TTS module.

Here, the processor 120 may not output a voice signal converted at a TTS module through a speaker, but input the voice signal into a verification module and detect an error in the voice signal. Here, the error in the voice signal may have occurred due to an error in the operation of the TTS module.

Specifically, the processor 120 may input a voice signal, which is output at a TTS module, into a verification module. At the verification module, a voice signal output at the TTS module may be converted into a text. In this case, the verification module may include an automatic speech recognition (ASR) module, and the automatic speech recognition module may be the same component as or a separate component from the aforementioned component converting a user voice into text data.

The processor 120 may compare a text converted through a verification module and input data and detect an error in a voice signal output at a TTS module. Here, input data compared with a text converted through a verification module may be text data that was stored in advance or received from an external apparatus, or the input data may be text data included in information on a response voice output at the aforementioned natural language generation module. As described above, text data input into a TTS module, and text data in which a voice signal output at a TTS module was converted may be compared. Therefore, an error in the operation of the TTS module may be detected. An embodiment in which an error in a voice signal is detected by comparing texts will be described in more detail with reference to FIG. 8.

Meanwhile, input data may include text data and data related to emotions for text data. Here, data related to emotions may have been stored in advance together with text data, or the data may have been received from an external apparatus, or may have been output together with text data at a natural language processing (NLP) module.

Meanwhile, the processor 120 may identify the emotion of a voice signal output at a TTS module based on the frequency characteristic of the voice signal output at the TTS module through a verification module. In this case, the operation of the processor 120 of converting a voice signal output at a TTS module into a text may be omitted.

The processor 120 may identify the emotion of an output voice signal by using an emotion database. Here, in the emotion database, the frequency characteristic of a voice signal according to the emotion of a user may have been stored. Here, the emotion database may be included inside the electronic apparatus 100, but the locally stored database is merely an example, and the emotion database may be included in an external server. Then, the processor 120 may compare the identified emotion of the voice signal and data related to emotions input into the TTS module, and detect an error in the operation of the TTS module.

Specifically, the processor 120 may analyze the spectrum of a voice signal output at the TTS module and acquire a frequency characteristic. For example, the processor 120 may acquire a frequency characteristic, such as the pitch of a voice signal, by using the frequency, amplitude, cycle, decibel, etc. of a voice signal output at a TTS module, and acquire a frequency characteristic, such as the change of the pitch of the voice, by using the change in the frequency, amplitude, and cycle. Then, the processor 120 may identify an emotion, a voice tone, a style, a prosody, etc. corresponding to the voice signal in the emotion database by using the pitch of the acquired voice signal and the change of the pitch. Here, an emotion corresponding to the voice signal may mean an emotional state exhibited by a user of a voice signal, such as joy, grief, anger, etc. Also, a voice tone may be the overall pitch of the voice of the voice signal. Meanwhile, a style is related to a way of speaking, and the voice style may mean a caring style, a lively style, a fast-speaking style, etc. Also, a prosody may be the phoneme, intonation, accent, etc. of the voice signal.

Meanwhile, the processor 120 may acquire a frequency characteristic of a voice signal based on a style token. Here, a style token may be an optional element for determining characteristics including the emotion, voice tone, style, and prosody information, etc. of a voice signal. For example, a style token may be a global style token (GST).

Specifically, style tokens may be a plurality of optional elements stored in advance, and a weight may be added to each optional element according to the characteristic of a voice signal. An electronic apparatus may acquire a desired characteristic of a voice signal by adding optional elements to which weights have been added. For example, in case voice synthesis is performed based on a characteristic generated by merging style tokens to which weights have been added, the speaker (woman, man, celebrity, etc.), state of emotion and personality (pleased, angry, busy, soft, blunt, etc.), etc. may be expressed. Here, a parameter for a weight for each style token according to a voice characteristic may have been stored after learning.

Then, the processor 120 may compare the identified emotion, voice tone, style, prosody, etc. and the data related to emotions included in the input data input into the TTS module, and detect an error in the operation of the TTS module. An embodiment in which an error in a voice signal is detected by comparing frequency characteristics will be described in more detail with reference to FIG. 9.

Meanwhile, the processor 120 may compare the length of a voice signal output at the TTS module and the length of a text included in the input data input into the TTS module and detect an error in the output voice signal. Here, the processor 120 may compare the length of time acquired based on the length of the voice signal, the number of characters of the text included in the input data, the number of words, etc. from the viewpoint of time, and detect an error in the output voice signal.

Specifically, if the difference between the length of the voice signal output at the TTS module and the length of the text included in the input data input into the TTS module is equal to or greater than a predetermined value, the processor 120 may determine that there is an error in the voice signal output at the TTS module. An embodiment in which an error in a voice signal is detected by comparing the length of sentences, as above, will be described in detail with reference to FIG. 10.

Each embodiment of detecting an error has been individually described, but in actual implementation, two or more error detection methods may be used together.

As another example, the processor 120 may output a voice signal output at the TTS module audibly outside the electronic apparatus 100 as a sound through the speaker (140 in FIG. 3), and when the sound is input through the microphone (150 in FIG. 3) provided on the electronic apparatus 100 and is converted into a voice signal, the processor 120 may input the converted voice signal into the verification module and detect an error in the voice signal output at the TTS module. This will be described in detail with reference to FIGS. 6 and 7.

Meanwhile, based on the result of detecting an error in the voice signal, the processor 120 may correct input data. Specifically, if an error in the voice signal output at the TTS module is detected, the processor 120 may correct input data input into the TTS module and acquire corrected input data.

For example, if an error in the voice signal is detected, the processor 120 may correct at least one of the spacing or the punctuation mark of the text included in the input data. As an example, if the length of texts or sentences is different, as in a case in which the text included in the input data input into the TTS module is "It looks like rainbow rice cake," and the voice signal output at the TTS module is "It looks like a rainbow," the processor 120 may adjust the spacing of the "rainbow rice cake" in which an error occurred like "It looks like rain V bow V rice V cake." As another example, the processor 120 may adjust (add, delete) the punctuation mark of the "rainbow rice cake" in which an error occurred like "It looks like rain.bow.rice.cake."

As another example, if an error in the voice signal is detected, the processor 120 may correct input data by applying a markup language, such as extensible markup language (XML), to text data included in the input data. A markup language may be one of languages specifying the structure of a document or data, and expresses the structures of a correction mark, annotation, and a document, separately from text data.

For example, a Markup Language may include a Hyper-Voice Markup Language (HVML), a Speech Synthesis Markup Language (SSML), a Call Control extensible Markup Language (CCXML), a Voice extensible Markup Language (VXML), etc. providing an index function for connection between a voice signal and text data. Here, an SSML may be a voice synthesis generation language for supporting various effects such as the pitch or speed of a voice at the TTS module.

For example, if an error in the voice signal is detected, the processor 120 may correct text data included in the input data as "<emphasis> rainbow rice cake</emphasis>."

<emphasis> is a tag providing an effect of emphasizing the word 'rainbow rice cake' in the voice signal. Other than this, various tags may be used, such as <prosody> which is a tag for controlling the volume, speed, and pitch of a voice, <p> which is a tag for adding temporary pause between paragraphs, and <s> which is a tag for adding temporary pause between sentences.

Meanwhile, the technology of the disclosure can also be applied in case text data included in the input data input into the TTS module is English. For example, in case the length of texts or sentences is different, as in a case in which text data included in the input data input into the TTS module is "I miss you, Grandad," and the voice signal output at the TTS module is "I kiss you, Grandad," the processor 120 may adjust the punctuation mark of "miss" in which an error occurred like "I miss. you. Grandad." As another example, if an error in the voice signal is detected, the processor 120 may correct text data included in the input data to "I<emphasis> miss</emphasis> you, Grandad."

Then, the processor 120 may resubmit the corrected input data into the TTS module, and acquire a corrected voice signal corresponding to the corrected input data. Next, the processor 120 may output the corrected voice signal from the TTS module. Here, the corrected voice signal output at the TTS module may be audibly output outside the electronic apparatus 100 through the speaker (140 in FIG. 3)

provided on the electronic apparatus 100. As another example, the corrected voice signal output at the TTS module may be resubmitted into the verification module.

Here, after the processor 120 outputs the voice signal through the speaker (140 in FIG. 3), if a corrected voice signal different from the voice signal output according to a verification operation is acquired, the processor 120 may output the corrected voice signal together with an indicator indicating that the voice signal has been corrected. Detailed explanation in this regard will be made with reference to FIG. 3.

As described above, as an error in a voice signal output at the TTS module is detected and corrected by using input data input into the TTS module, there is an effect that implementation of a more correct conversation system becomes possible.

Figure 3:
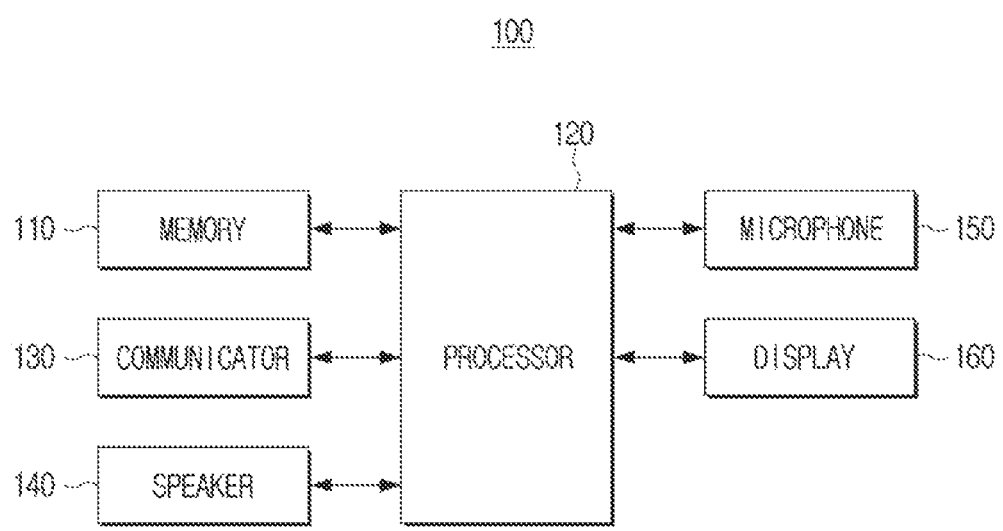
FIG. 3 is a block diagram illustrating a detailed configuration of the electronic apparatus illustrated in FIG. 2 according to an embodiment of the disclosure.

FIG. 3 is a block diagram illustrating a detailed configuration of the electronic apparatus illustrated in FIG. 2.

Referring to FIG. 3, the electronic apparatus 100 may include a memory 110, a processor 120, a communicator 130, a speaker 140, a microphone 150, and a display 160.

Here, some components of the memory 110 and the processor 120 are similar to the components illustrated in FIG. 2. Thus, redundant descriptions thereof will be omitted.

The communicator 130 is a component performing communication with various types of external apparatuses according to various types of communication methods. Here, an external apparatus communicating with the electronic apparatus 100 may be a server or a user terminal apparatus, etc.

Communicative connection of the communicator 130 with an external apparatus may include communication via a third apparatus (e.g., a repeater, a hub, an access point, a server, or a gateway). The communicator may be implemented as a wireless communication interface for performing wireless communication, which may include, for example, cellular communication using at least one of LTE, LTE Advance (LTE-A), code division multiple access (CDMA), wideband CDMA (WCDMA), a universal mobile telecommunications system (UMTS), Wireless Broadband (WiBro), or a Global System for Mobile Communications (GSM). According to an embodiment, wireless communication may include, for example, at least one of wireless fidelity (WiFi), Bluetooth, Bluetooth low energy (BLE), Zigbee, near field communication (NFC), Magnetic Secure Transmission, radio frequency (RF), or a body area network (BAN). The communicator may also be implemented as wired communication, such as an optical or Ethernet network interface controller (NIC), which may include, for example, at least one of a universal serial bus (USB), a high definition multimedia interface (HDMI), a recommended standard 232 (RS-232), power line communication, or a plain old telephone service (POTS). Networks over which wireless communication or wired communication is performed may include at least one of a telecommunication network, for example, a computer network (e.g.: an LAN or a WAN), the Internet, or a telephone network.

The processor 120 may transmit a voice signal output at the TTS module to an external apparatus through the communicator 130. Specifically, a voice signal output at the TTS module may be information in the form of a voice waveform. Here, an external apparatus may be an apparatus including a speaker outputting the received information in the form of a voice waveform.

Meanwhile, a voice signal may be received from an external apparatus through the communicator 130. As an example, a voice signal received through the communicator 130 may be a voice signal received through a microphone provided on an external apparatus. Here, the voice signal received through a microphone may be a voice signal output through a speaker provided on an external apparatus. Also, here, the voice signal output through a speaker provided on an external apparatus may be a voice signal transmitted from the electronic apparatus 100 to an external apparatus through the communicator 130.

Then, the processor 120 may detect an error in the voice signal received from an external apparatus through the communicator 130 based on input data input into the TTS module.

Also, when detecting an error in the voice signal received through the communicator 130, the processor 120 may acquire a corrected voice signal, and retransmit the signal to the external apparatus through the communicator 130. To the error detection method and the error correction method, both of the detection method and the correction method of the disclosure can be applied.

The speaker 140 is a component outputting various kinds of notification sounds or voice messages as well as various kinds of audio data for which various processing operations such as decoding or amplification and noise filtering have been performed by an audio processor. In particular, the speaker 140 may output a voice signal in the form of a voice waveform as a sound in the form of a natural language. Here, a voice output may correspond to pre-stored text data such as an electronic book, or may be a response to a user inquiry output as a voice message in the form of a natural language. Meanwhile, a component for outputting audio may be implemented as a speaker, but this is merely an example, and the component may be implemented as an output terminal that can output audio data.

The microphone 150 is a component for receiving input of a user voice uttered. The microphone 150 may generate (or, convert) a speech or a sound received from the outside into an electronic signal by the control of the processor 120. The electronic signal generated at the microphone 150 may be converted by control of the processor 120 and stored in the memory 110.

The processor 120 may input a user voice signal received through the microphone 150 into a voice recognition module and convert the user voice signal into a text. Here, when a user voice signal including a triggering word is received through the microphone 150, the processor 120 may input the input user voice signal into a voice recognition module.

Meanwhile, the processor 120 may input the voice signal received through the microphone 150 into a verification module. Here, the voice received through the microphone 150 may be a voice output through the speaker 140.

Here, the processor 120 may identify an identity of the speaker of the voice signal received through the microphone 150, and according to the identification result, may input the received voice signal into the voice recognition module, or into the verification module. Specifically, if, as a result of identifying the speaker of the voice signal received through the microphone 150, the voice signal was uttered by a user, the processor 120 may input the received voice signal into the voice recognition module, and convert the signal into a text.

Meanwhile, if the voice signal received through the microphone 150 is a response voice signal output by the speaker 140, the processor 120 may input the received voice signal into the verification module and detect an error in the received voice signal. Here, the processor 120 may detect an error in the voice signal received through the microphone 150 by using input data input into the TTS module for outputting the voice signal to the speaker 140. Specifically, the processor 120 may convert the voice signal received through the microphone 150 into a text by using the voice recognition module and compare the text with text data included in the input data, or detect an error in the voice signal received through the microphone 150 by using a frequency characteristic. Alternatively, the processor 120 may compare the length of the voice signal received through the microphone 150 and the length of text data included in the input data and detect an error in the voice signal received through the microphone 150.

Here, if an error in the voice signal received through the microphone 150 is detected, the processor 120 may change the spacing of the text included in the input data, or change the punctuation mark or apply an SSML, and thereby acquire corrected input data. Then, the processor 120 may input the corrected input data into the TTS module, and acquire a corrected voice signal. Then, in case the processor 120 outputs the corrected voice signal through the speaker 140, the processor 120 may also output an indicator indicating that the voice is a corrected voice.

Here, an indicator may include a feedback voice such as "It is not so," "Um," "In other words," "Oh! It's not true," etc. Such a feedback voice may be selected according to emotion information, style information, and text information included in the corrected input data. A feedback voice may be a recorded voice stored in the memory 110, or a synthesized voice synthesized by the TTS module, or the feedback voice may be acquired by a method of re-using a voice signal reproduced earlier by a caching method, etc. for efficiency of the operation amount and the bandwidth available to the apparatus 100.

For example, if a situation in which a conversation system is implemented is a serious mood, the processor 120 may select a feedback voice such as "Um . . . In other words," among a plurality of indicators. Here, as a result of sensing a location through a GPS sensor, in case the place in which the electronic apparatus 100 is located is an office, and as a result of identifying the speaker, the speaker is a specific person such as the representative of the company, and the voice of the output voice included in input data is selected as the voice of an announcer, the processor 120 may detect that the situation in which the conversation system is implemented is a serious mood based on the result of detecting facial expressions of people in a surrounding environment with a camera, etc.

Meanwhile, if a situation in which the conversation system is implemented is a pleasant mood, the processor 120 may select a feedback voice such as "Oh! My mistake~ It's not so~" among a plurality of indicators. Here, as a result of sensing a location through a GPS sensor, in case the place in which the electronic apparatus 100 is located is outdoors such as a mountain or sea, and an outdoor activity is included in the schedule information stored in a calendar application, and the identified speaker is a child, and the voice of the output voice included in the input data is a comedian, etc., the processor 120 may detect that the situation in which the conversation system is implemented is a pleasant mood.

Then, the processor 120 may output an indicator such as "It is not so," "Um~," "In other words," "Oh! It's not true," etc. through the speaker 140 first, and then output a corrected voice signal.

The display 160 may display various information according to control of the processor 120.

Specifically, the display 160 may display text data to be output as a voice signal.

Alternatively, depending on embodiments, the display 160 may display response information corresponding to a user voice instruction. Or, the display 160 may display a message informing the user that response information has been corrected. Also, the display 160 may be implemented as a touch screen together with a touch panel.

Meanwhile, in FIG. 3, all of the speaker 140, the microphone 150, and the display 160 are included in the electronic apparatus 100. However, in actual implementation, at least one of the speaker 140, the microphone 150, or the display 160 may be omitted, depending on embodiments. For example, in case the electronic apparatus 100 is a server, the electronic apparatus 100 may include only the memory 110, the processor 120, and the communicator 130.

Meanwhile, although it is not illustrated in FIG. 3, depending on embodiments, the electronic apparatus 100 may further include a sensor for sensing the surrounding environment, a camera, various external input ports for connecting to an external terminal, various sensors, etc.

Figure 6:
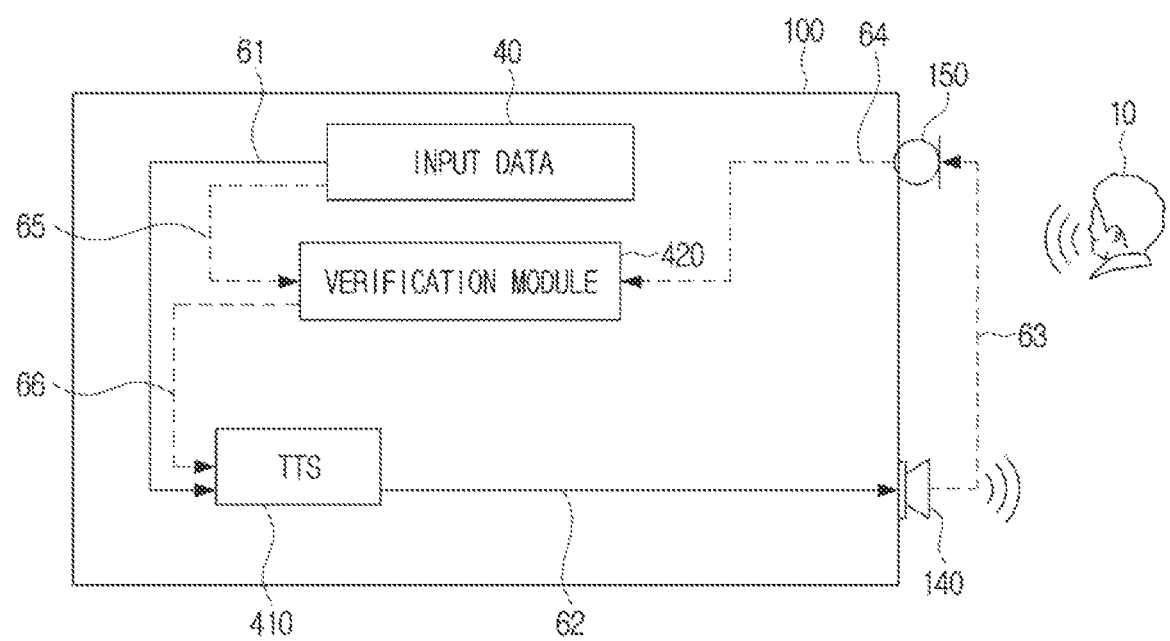
FIG. 6 is a diagram illustrating an electronic apparatus verifying a TTS module according to an embodiment of the disclosure.

FIGS. 4, 6 to 9, and 11 are diagrams illustrating various examples of an electronic apparatus 100 verifying a TTS module. In FIGS. 4, 6, and 7, for the convenience of explanation, a general process of a voice recognition operation was illustrated in a solid line, and a process of a verification operation was illustrated in a dashed line.

Specifically, FIG. 4 illustrates an embodiment in which a verification operation is performed while a voice signal output by a TTS module is not output through the speaker 140.

The electronic apparatus 100 may acquire input data 40 to be input into a text to speech (TTS) module 410, and provide the acquired input data 40 as input 41 into the TTS module 410, and acquire a voice signal. Here, the electronic apparatus 100 may acquire data stored in the memory in advance or data received from an external apparatus as input data 40, or analyze the voice uttered by a user 10 and acquire response information output at a natural language processing module as input data 40. An operation of analyzing the input voice of the user 10 and acquiring the input data 40 will be described in detail with reference to FIG. 5.

Then, the electronic apparatus 100 may output the voice signal 42 acquired by the TTS module 410 through the speaker 140. Next, the electronic apparatus 100 may input the voice signal 43 acquired by the TTS module 410 into the verification module 420 and detect an error in the voice signal. Here, in FIG. 4, it is illustrated that a verification operation was performed while the acquired voice signal is being output through the speaker. However, in actual implementation, a verification operation may be performed before outputting the voice signal 42 acquired by the TTS module 410 through the speaker 140. That is, an operation of outputting the voice signal 42 acquired by the TTS module 410 through the speaker 140 may be omitted.

Specifically, the electronic apparatus 100 may provide as input 44 the input data 40 into the verification module 420, and compare the input voice signal and the input data 40 to verify an error in the voice signal.

Here, the electronic apparatus 100 may detect an error in the voice signal through text comparison, frequency characteristic comparison, sentence length comparison, etc. through the verification module 420. More detailed explanation in this regard will be made with reference to FIGS. 8, 9 and 11.

If, as a result of performing verification, there is no error in the voice signal, the electronic apparatus 100 may output the voice signal acquired at the TTS module 410 through the speaker 140. Alternatively, the electronic apparatus 100 may again provide as input 42 the input data 40 into the TTS module 410, and provide as output 42 the acquired voice signal through the speaker 140. Or, if the electronic apparatus 100 was outputting the acquired voice signal through the speaker 140, the electronic apparatus 100 may continue with the outputting of the voice signal 42.

Meanwhile, if it is determined that there is an error in the voice signal, the electronic apparatus 100 may correct the input data, and provide as input 45 a verification result including the corrected input data into the TTS module 410. Here, the corrected input data may be data which changed the spacing of the text data, changed the punctuation mark, and applied a Markup Language, or the corrected input data may be data which changed the frequency characteristic of the data related to emotion. In FIG. 4, it is illustrated that corrected input data was acquired at the verification module 420, but in actual implementation, the operation may be implemented at a separate module.

Also, the electronic apparatus 100 may again provide as input 43 the corrected voice signal output at the TTS module 410 into the verification module and re-verify the signal, or provide as output 42 the signal through the speaker 140.

Here, if the previous voice signal was being output through the speaker 140, the electronic apparatus 100 may output an indicator indicating that the voice signal was corrected, and output the corrected voice signal. For example, the electronic apparatus 100 may output "It is not so," "Um~," "In other words," "Oh! It's not true," etc. through the speaker 140 as an indicator, and then output the corrected voice signal.

As described above, by comparing the input data input into the TTS module 410 and the voice signal output at the TTS module 410, an error in a voice synthesis operation at the TTS module may be detected, and through correction of input data, a more precise conversation system may be implemented.

Meanwhile, in FIG. 4 described above, the voice signal output at the TTS module 410 was transmitted to the verification module 420, but as illustrated in FIG. 6, the voice signal acquired at the TTS module 410 may be output outside through the speaker 140, and the response voice signal received through the microphone 150 may be transmitted to the verification module 420.

Figure 5:
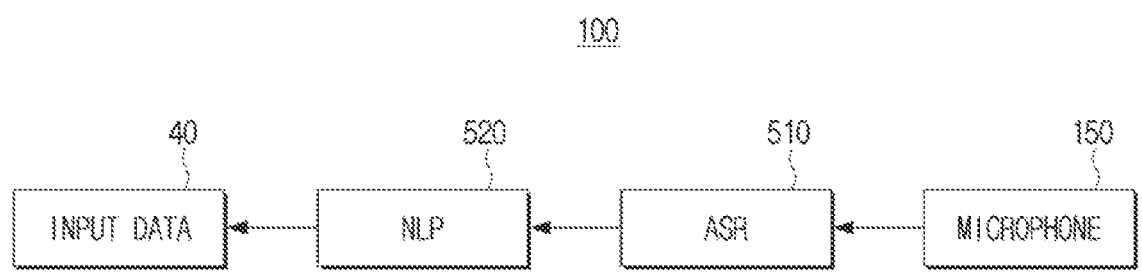
FIG. 5 is a diagram illustrating an electronic apparatus according to an embodiment of the disclosure.

FIG. 5 is a diagram illustrating an electronic apparatus according to an embodiment of the disclosure.

Referring to FIG. 5, the electronic apparatus 100 may receive a user voice uttered by a user through the microphone 150, and input the received user voice into a speech recognition (ASR) module 510 and convert the voice into text data. Then, the electronic apparatus 100 may input the converted text data into a natural language processing (NLP) module 520 and acquire information on the response voice for the user voice as input data 40. Here, the input data 40 may include text data of the response content and information related to the emotion corresponding to the response content. Here, information related to the emotion may include voice tone information, style information, prosody information, etc.

As described above, the electronic apparatus 100 may input the input data 40 acquired by analyzing a user voice into the TTS module, and acquire a response voice signal for the user voice.

FIG. 6 is a diagram illustrating an electronic apparatus verifying a TTS module according to an embodiment of the disclosure. In FIG. 6, a voice signal output at the TTS module is output through the speaker, and the voice signal output through the microphone is received again and compared with input data. Thereby, whether the voice synthesis operation of the TTS module is normal may be determined.

Referring to FIG. 6, the electronic apparatus 100 may acquire input data 40 to be input into the text to speech (TTS) module 410, and input 61 the acquired input data 40 into the TTS module 410 and acquire a voice signal. Here, the electronic apparatus 100 may acquire data stored in the memory in advance or data received from an external apparatus as input data, or as illustrated in FIG. 5, the electronic apparatus 100 may receive a voice uttered by a user 10 through the microphone 150, and process the received user voice through an automatic speech recognition (ASR) module and a natural language processing module (NLP), and acquire the acquired response information as the input data 40.

Then, the electronic apparatus 100 may provide as output 62 the voice signal output at the TTS module 410 through the speaker 140. Also, the voice signal output through the speaker 140 may be received as input 63 through the microphone 150.

Next, the electronic apparatus 100 may input the voice signal received through the microphone 150 into the verification module 420 and detect an error in the response voice signal 64.

Here, the electronic apparatus 100 may provide as input 65 the input data 40 into the verification module 420, and the verification module 420 may detect an error in the voice signal input through the microphone 150 by using the input data 40. Specifically, the electronic apparatus 100 may detect an error in the voice signal through text comparison, frequency characteristic comparison, sentence length comparison, etc. More detailed explanation in this regard will be made with reference to FIGS. 8, 9 and 11.

If, as a result of performing verification, there is no error in the voice signal, the electronic apparatus 100 may continue outputting the voice signal output at the TTS module 410 through the speaker 140, and complete outputting of the voice signal.

Meanwhile, if it is determined that there is an error in the voice signal, the electronic apparatus 100 may correct the input data 40 through the verification module 420, and provide as input 66 the corrected input data into the TTS module 410. Specifically, the corrected input data may be data which changed the spacing of the text data included in the input data 40, changed the punctuation mark, applied a markup language, or changed the frequency characteristic included in the information related to emotions. In FIG. 6, it is illustrated that the corrected input data is acquired at the verification module 420, but in actual implementation, the operation may be implemented at a separate module.

Then, the electronic apparatus 100 may provide as output 62 the corrected voice signal output at the TTS module 410 through the speaker 140.

Here, if the previous voice signal was being output through the speaker 140, the electronic apparatus 100 may output an indicator indicating that the voice signal was corrected, and output the corrected voice signal. For example, the electronic apparatus 100 may output "It is not so," "Um~," "In other words," "Oh! It's not true," etc. through the speaker 140 first as an indicator, and then output the corrected voice signal.

Meanwhile, depending on embodiments, the verification operation illustrated in FIG. 4 and the verification operation illustrated in FIG. 6 may be implemented together. Meanwhile, the electronic apparatus 100 may recognize 710 the speaker of the received voice signal as illustrated in FIG. 7, for identifying whether to transmit as input 72 the voice signal 71 received through the microphone 150 to the voice recognition module, or to transmit as input 77 the signal to the verification module.

Referring to FIG. 7, the electronic apparatus 100 may first receive a user voice uttered by the user 10 through the microphone 150, and recognize the speaker of the received voice signal 71. Then, the electronic apparatus 100 may differently process the received voice signal depending on the result of speaker recognition 710. If, as a result of speaker recognition, it is determined that the speaker of the received voice signal is the user 10, the electronic apparatus 100 may provide as input 72 the received voice signal into the speech recognition (ASR) module 510. Then, the electronic apparatus 100 may acquire input data 40 to be input into the TTS module 410 by using the speech recognition (ASR) module 510 and the natural language processing (NLP) module 520.

Meanwhile, as a result of recognizing 710 the speaker, the electronic apparatus 100 may identify an identity of the speaker, and based on the result of speaker identification, acquire input data 40. Specifically, based on the result of recognizing 710 the speaker, the electronic apparatus 100 may acquire information on a response voice that varies according to the user identified through the natural language processing (NLP) module 520 as the input data 40. For example, in an environment in which a plurality of users may use the electronic apparatus 100, such as a home, if a user voice is input, the electronic apparatus 100 may recognize 710 the speaker, and identify the speaker to which the voice belongs. Here, if it is identified that the speaker is the first user, the electronic apparatus 100 may acquire information on a response voice corresponding to the first user as the input data 40. For example, the electronic apparatus 100 may acquire emotion information related to the response text and also voice tone information, voice style information, prosody information, etc. that the first user prefers as the input data 40.

Then, the electronic apparatus 100 may provide as input 73 the acquired input data 40 into the TTS module 410.

As the operations in each module are similar to the operations in FIGS. 4 to 6, redundant explanations thereof will be omitted.

Meanwhile, the electronic apparatus 100 may provide as output 74 a voice signal for the input data output at the TTS module 410 through the speaker 140. Then, the voice signal output through the speaker 140 may be received 76 through the microphone 150. Here, depending on embodiments, the electronic apparatus 100 may provide as input 75 the voice signal output at the TTS module 410 into the verification module 420.

Here, the electronic apparatus 100 may recognize 710 the speaker for identifying whether the voice signal 71 received through the microphone 150 is a user voice signal or a response voice signal output at the speaker 140. If it is determined that the speaker of the voice signal received through the microphone 150 is the user, the electronic apparatus 100 may provide as input 72 the received voice into the speech recognition (ASR) module 510 for performing a general voice recognition operation.

Figure 8:
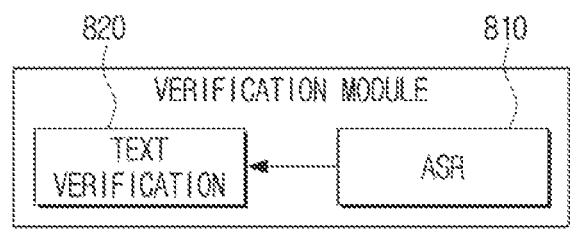
FIG. 8 is a diagram illustrating a verification module according to an embodiment of the disclosure.
Figure 9:
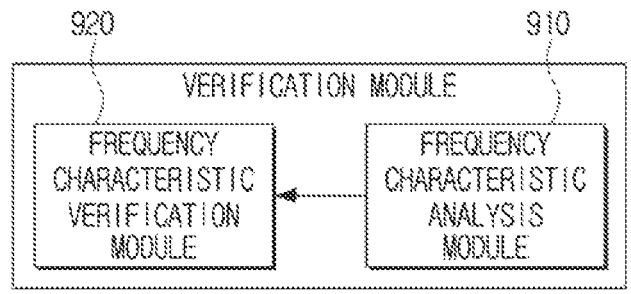
FIG. 9 is a diagram illustrating a verification module according to an embodiment of the disclosure.
Figure 11:
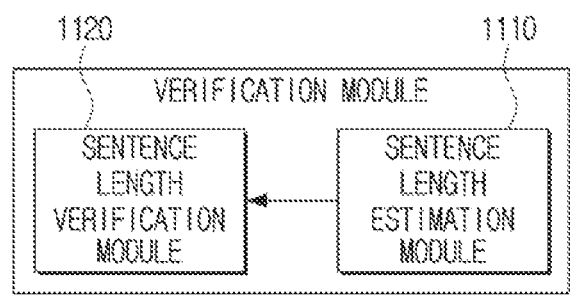
FIG. 11 is a diagram illustrating a verification module according to an embodiment of the disclosure.

Meanwhile, if it is determined that the voice signal received through the microphone 150 was output through the speaker 140, the electronic apparatus 100 may provide as input 77 the received voice signal into the verification module 420. The verification module 420 may include at least one of a verification module using a text, a verification module using a frequency characteristic, or a verification module using the length of the sentence, as illustrated in FIGS. 8, 9 and 11. Specifically, the electronic apparatus 100 may provide as input 78 the input data 40 input into the TTS module 410 into the verification module 420, and the verification module 420 may compare the input data 40 and the input 77 voice signal, and detect an error in the voice signal.

Meanwhile, a speaker recognition 710 operation may be optional, and depending on embodiments, the electronic apparatus 100 may directly input a voice signal, which was received through the microphone 150 within a predetermined time period after a response voice signal was output through the speaker 140, into the verification module 420, without a speaker recognition 710 operation.

Here, the electronic apparatus 100 may input information on the response voice based on the speaker identification result into the verification module 420 as input data 40, and compare the voice signal output at the TTS module 410 and detect an error in the voice synthesis operation at the TTS module.

Then, based on the verification result, if there is no error in the voice signal, the electronic apparatus 100 may continue outputting of the voice signal and complete outputting of the voice. Meanwhile, if there is an error in the voice signal, the electronic apparatus 100 may correct the input data 40 output at the natural language processing module 520, and provide as input 79 the corrected input data into the TTS module 410.

As an example, in case a response voice corresponding to the first user which is the identified speaker is a response voice of a high pitch, but the pitch of the voice signal 74, 75 output at the TTS module 410 is a relatively low pitch, the verification module 420 may provide as input 79 the corrected input data into the TTS module 410 so that the pitch of the voice is heightened to better correspond to the pitch of the identified speaker. For example, the electronic apparatus 100 may correct the input data as below.

<speak version="1.0">
  <prosody pitch="150 Hz"> Transpose pitch to 150 Hz</prosody>
</speak>

Then, the electronic apparatus 100 may provide as output 74 the corrected voice signal acquired through the TTS module 410 through the speaker 140. Here, the electronic apparatus 100 may also output an indicator indicating that the response voice signal was corrected.

FIG. 8 is a diagram illustrating a verification module according to an embodiment of the disclosure. In FIG. 8, an error in a response voice signal is detected through text comparison. The configuration of the verification module in FIG. 8 may be the same configuration as that of the verification module 420 in FIGS. 4, 6 and 7.

Referring to FIG. 8, the verification module may include a speech recognition module (e.g., ASR) module 810 and a text verification module 820. In FIG. 8, the verification module is illustrated as divided into a plurality of modules, for the convenience of explanation. However, in actual implementation, the verification module may be implemented as one module, or as one or more software modules.

Specifically, the electronic apparatus may input a voice signal output at the TTS module into the voice recognition module 810 and acquire text data corresponding to the voice signal. Here, the voice signal input into the voice recognition module 810 may be a voice signal output at the TTS module and then directly input into the voice recognition module 810, or output to the outside from the TTS module through the speaker and was then input through the microphone.

In FIG. 8, it is illustrated that the voice recognition module 510 illustrated in FIGS. 5 and 7 and the voice recognition module 810 included in the verification module are separate modules, but the modules may be integrally provided as a single module.

Also, the electronic apparatus may input the text data output at the voice recognition module 810 into the text verification module 820 and detect an error in the voice signal. Specifically, if the text data included in the input data input into the TTS module and the text output at the voice recognition module 810 are different, the text verification module 820 may determine that there is an error in the voice signal.

Meanwhile, if it is determined that there is an error in the voice signal, the text verification module 820 may correct the input data. Specifically, the text verification module 820 may correct the input data by performing at least one of change of the spacing of the text data included in the input data, change of the punctuation mark, or application of a markup language. For example, if the texts are different, as in a case in which the text data included in the input data is "It looks like rainbow rice cake," and the text data output at the voice recognition module 810 is "It looks like a rainbow," the text verification module 820 may correct the input data by adjusting the spacing of the "rainbow rice cake" in which an error occurred like "It looks like rain V bow V rice V cake," or adjusting the punctuation mark of the "rainbow rice cake" in which an error occurred like "It looks like rain.bow.rice.cake," or applying a markup language to the text data, for example, a Speech Synthesis Markup Language (SSML) like "<emphasis> rainbow rice cake</emphasis> it looks like." Meanwhile, in FIG. 8, it is illustrated that the text verification module 820 corrects input data, but in actual implementation, input data may be corrected by acquiring only a correction value at the text verification module 820, and reflecting only the correction value at a separate correction module.

Then, the electronic apparatus may input a verification result including the corrected input data into the TTS module and output a corrected voice signal.

FIG. 9 is a diagram illustrating a verification module according to an embodiment of the disclosure. In FIG. 9, an error in a voice signal is detected through frequency characteristic comparison. The configuration of the verification module in FIG. 9 may be similar to the configuration as that of the verification module 420 in FIGS. 4, 6 and 7.

Referring to FIG. 9, the verification module may include a frequency characteristic analysis module 910 and a frequency characteristic verification module 920. In FIG. 9, the verification module is described while being divided into a plurality of modules, for the convenience of explanation. However, in actual implementation, the verification module may be implemented as one module, or as one or more software modules.

Specifically, the electronic apparatus may input a voice signal output at the TTS module into the frequency characteristic analysis module 910 and acquire the frequency characteristic of the voice signal. Here, the voice signal input into the frequency characteristic analysis module 910 may be a voice signal output at the TTS module and then directly input into the frequency characteristic analysis module 910, or output to the outside from the TTS module through the speaker and was then input through the microphone.

Here, the frequency characteristic analysis module 910 may analyze the spectrum of a voice signal and acquire a frequency characteristic. For example, the frequency characteristic analysis module 910 may acquire a frequency characteristic, such as the pitch of a voice signal by using the frequency, amplitude, cycle, decibel, etc. of a voice signal, and acquire a frequency characteristic, such as the change of the pitch of the voice, by using the change in the frequency, amplitude, and cycle.

Then, the frequency characteristic analysis module 910 may identify an emotion, a voice tone, a style, a prosody, etc. in the emotion database by using the pitch of the acquired voice signal and the change of the pitch.

Also, the electronic apparatus may input the analysis result of the frequency characteristic of the voice signal acquired at the frequency characteristic analysis module 910 into the frequency characteristic verification module 920 and detect an error in the voice signal.

The frequency characteristic verification module 920 may compare the emotion, voice tone, style, prosody, etc. of the voice signal identified by the frequency characteristic analysis module 910 and the data related to emotions included in the input data input into the TTS module, and determine that there is an error in the voice signal.

Meanwhile, if it is determined that there is an error in the voice signal, the frequency characteristic verification module 920 may correct the input data. Specifically, the frequency characteristic verification module 920 may correct the input data by applying a markup language, for example, an SSML to the text data included in the input data input into the TTS module. For example, the frequency characteristic verification module 920 may adjust the frequency pitch through application of an SSML like<prosody pitch="150 Hz> transpose pitch to 150 Hz</prosody>, and thereby make the intended emotion expressed through change of the pitch of the voice. As another example, the frequency characteristic verification module 920 may correct the spectrum of the voice like 'attributeName: Tone', 'attributevalue: reinforcement of the high pitch, reinforcement of the low pitch.'

Meanwhile, the frequency characteristics such as the emotion, style, etc. of the voice signal were acquired by using style tokens, the frequency characteristic verification module 920 may correct the input data by changing the weight for each style token.

Figure 15:
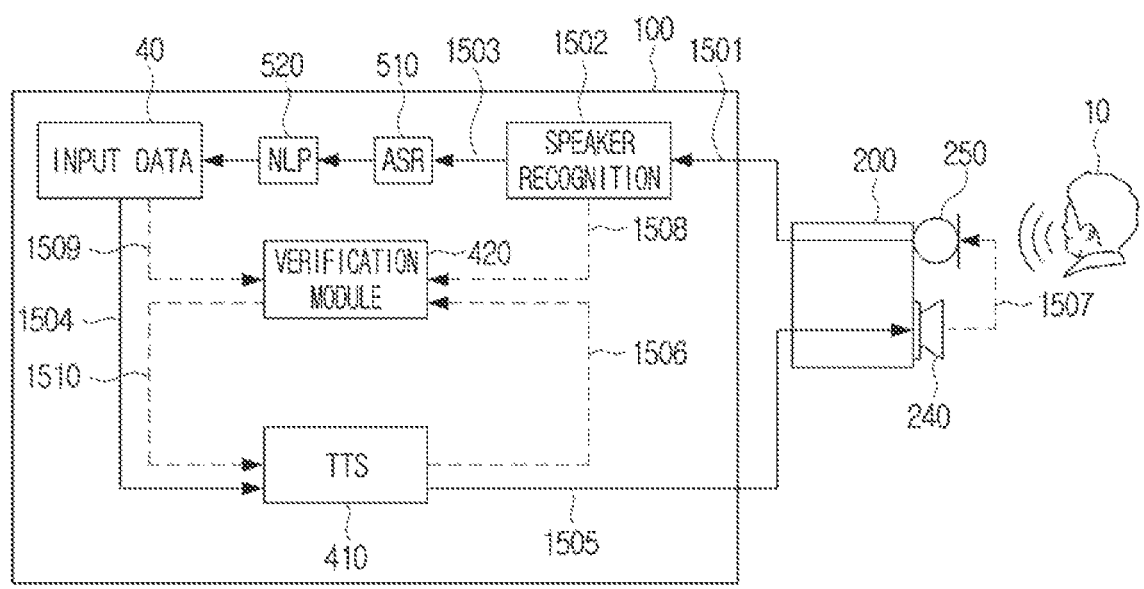
FIG. 15 is a diagram illustrating operations of the electronic apparatus in FIG. 12 according to an embodiment of the disclosure.

Meanwhile, if it is determined that there is an error in the voice signal, the frequency characteristic verification module 920 may adjust the filter values, etc. of the output hardware (a digital analog converter (DAC), an amp, etc.), or adjust the characteristic of the speaker provided on the electronic apparatus, as illustrated in FIG. 15. In this case, the voice signal input into the frequency characteristic analysis module 910 may have been received by the microphone after being output through the speaker.

Figure 10:
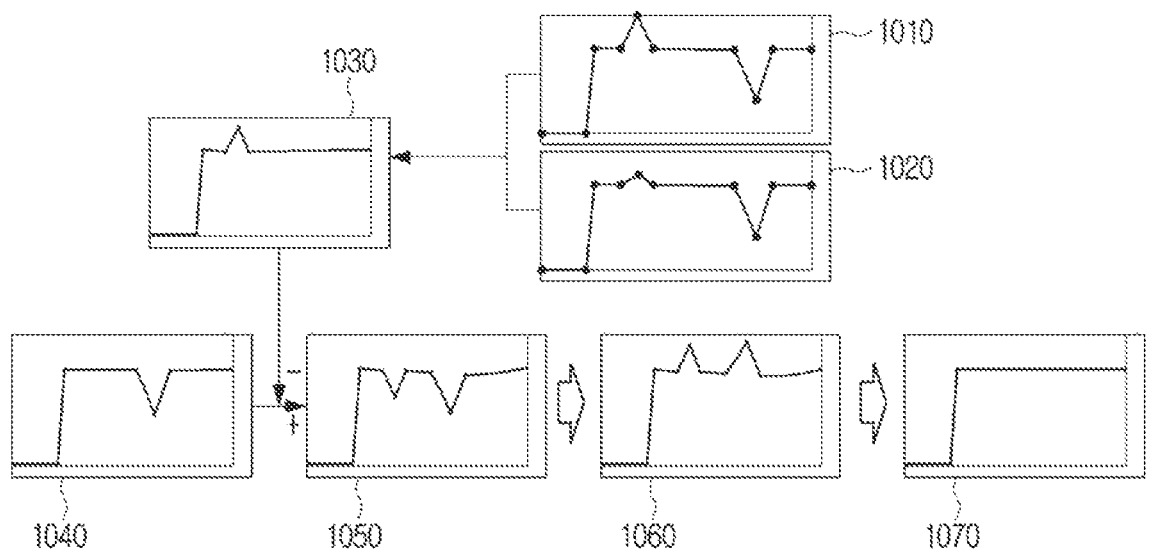
FIG. 10 is a diagram illustrating a method of correcting a characteristic of a speaker according to an embodiment of the disclosure.

In general, there are many cases in which a speaker mounted on an electronic apparatus, such as an AI speaker and a robot, do not produce an ideal result. FIG. 10 illustrates a method of correcting output of a speaker for making a user hearing a voice in such an environment hear a correct sound. For checking whether a voice uttered through a speaker was uttered well, analysis using a microphone included in the system may be necessary. However, in case even such a microphone is not ideal, incorrect correction of the speaker may occur.

Referring to FIG. 10, for solving such a problem, the electronic apparatus may first derive a microphone characteristic 1030 by using a test tone 1010 of a constant phase and a test tone 1020 of an inverse phase. Here, a test tone may be a spectrum generated as the microphone receives a sweep signal of a constant phase or an inverse phase output from the electronic apparatus, and the sweep signal may be a test signal expressing all frequency bands from a low frequency to a high frequency per unit time. Here, the horizontal axis of the text tone 1010, 1020 may be a frequency band, and the longitudinal axis may be distribution of energy values for each frequency band. Also, the microphone characteristic 1030 may be acquired as a difference between the spectrum 1010 of the sweep signal of a constant phase and the spectrum 1020 of the sweep signal of an inverse phase.

Then, the electronic apparatus may remove the microphone characteristic 1030 acquired at the signal 1040 input at the microphone and extract the characteristic 1050 of only the speaker of the voice (microphone input-microphone characteristic=speaker characteristic). Here, the signal 1040 input at the microphone may have frequency characteristics including the characteristics of both the speaker and the microphone.

Meanwhile, the electronic apparatus may store characteristics of one or more microphones that can be connected to the electronic apparatus. Here, the one or more microphones that can be connected to the electronic apparatus may be microphones that are provided on the electronic apparatus, or provided on an external apparatus connected to the electronic apparatus. Also, the electronic apparatus may identify which microphone from among the connectable microphones receives the user voice, and extract the characteristic of only the speaker by reflecting or compensating for the characteristic of the identified microphone. Here, the speaker outputting a test signal may also be provided on the electronic apparatus, or the speaker may be provided on an external apparatus connected to the electronic apparatus. In addition, the speaker that output a test signal and the microphone that received the test signal may be provided on the same apparatus, or may be provided on different apparatuses.

Then, the electronic apparatus may apply the equalizer (EQ) correction value 1060 to suit the extracted characteristic 1050 of only the speaker, and output a reference value 1070. Here, EQ correction may be correction such that a predefined reference output comes out from every electronic apparatus, and as illustrated in FIG. 10, the reference value 1070 may be a flat spectrum.

Although not illustrated, the electronic apparatus may additionally correct an EQ gain in case the environment noise level is large through noise spectrum analysis. For example, the electronic apparatus may determine through the microphone a voice received throughout the overall frequency band, which is not a voice signal in which the energy of a specific frequency band is large, as an environment noise. Then, the electronic apparatus may adjust amplitude of the output signal upwardly at the time of EQ gain correction, according to the size of the energy of the environment noise. Specifically, in case the average of the size of the energy of the environment noise is larger than the reference value, the electronic apparatus may increase the size of the output signal throughout the overall frequency band such that the size is in proportion to a difference between the average value and the reference value of the size. For example, if the average of the size of the environment noise is larger than the reference value as much as a first value, the electronic apparatus may adjust the size of the output signal upwardly as much as 3 dB throughout the overall frequency band, and if the average of the size of the environment noise is larger than the reference value as much as a second value which is greater than the first value, the electronic apparatus may increase the size of the output signal by as much as 4 dB throughout the overall frequency band. As another example, in case the energy of a specific frequency is large in the environment noise, the electronic apparatus may correspondingly increase only the signal of the frequency band at the time of EQ gain correction.

As described above, by correcting the speaker characteristic to coincide with a predetermined reference output, a more precise conversation system may be provided.

Meanwhile, correction for expressing the intended emotion through frequency characteristic analysis may be performed every time a user voice is input. Meanwhile, correction of a voice spectrum through frequency analysis, adjustment of a filter value of output hardware, correction of a speaker characteristic, etc. may be performed in a predetermined cycle or only when the electronic apparatus initially performs a conversation system.

Meanwhile, in FIG. 9, it is illustrated that the frequency characteristic verification module 920 corrects input data. However, in actual implementation, the frequency characteristic verification module 920 may acquire only a correction value, and a separate correction module may correct input data.

Then, the electronic apparatus may input a verification result including the corrected input data into the TTS module, and output a corrected voice signal.

Referring to FIG. 11, the verification module may include a sentence length estimation module 1110 and a sentence length verification module 1120. In FIG. 11, the verification module is illustrated as divided into a plurality of modules, for the convenience of explanation. However, in actual implementation, the verification module may be implemented as one module, or as one or more software modules.

Specifically, the electronic apparatus may input a voice signal output at the TTS module into the sentence length estimation module 1110 and acquire a sentence length corresponding to the voice signal. Here, the voice signal input into the sentence length estimation module 1110 may be a voice signal output at the TTS module and then input into the sentence length estimation module 1110 directly, or output to the outside from the TTS module through the speaker and then input through the microphone.

Specifically, the sentence length estimation module 1110 may estimate a sentence length with the length of the voice signal.

Also, the electronic apparatus may input information on the sentence length of the voice signal acquired at the sentence length estimation module 1110 into the sentence length verification module 1120 and detect an error in the voice signal.

Specifically, the sentence length verification module 1120 may compare the sentence length of the voice signal and the length of the text data included in the input data and detect an error in the voice signal. Here, the sentence length verification module 1120 may compare the length of the acquired time and the sentence length of the voice signal acquired at the sentence length estimation module 1110 based on the number of characters and the number of words of the text included in the input data. If there is a difference equal to or greater than a predetermined value, an error in the voice signal output at the TTS module may be determined.

As described above, simplified error detection can be possible without changing a voice signal output at the TTS module into a text.

In addition, if there is a difference equal to or greater than a predetermined value in the sentence length, the sentence length verification module 1120 may input the voice signal output at the TTS module into the voice recognition module and acquire a text, and compare the acquired text and the text included in the input data, and more precisely detect an error.

Meanwhile, if it is determined that there is an error in the voice signal, the sentence length verification module 1120 may correct the input data. Specifically, the sentence length verification module 1120 may correct the input data by performing at least one of change of the spacing of the text data included in the input data, change of the punctuation mark, or application of a Markup Language, e.g., an SSML.

Meanwhile, in FIG. 11, it was described that the sentence length verification module 1120 acquires corrected information. However, in actual implementation, the sentence length verification module 1120 may acquire only a correction value, and a separate correction module may correct input data.

Then, the electronic apparatus may input a verification result including the corrected input data into the TTS module and output a corrected voice signal.

Figure 12:
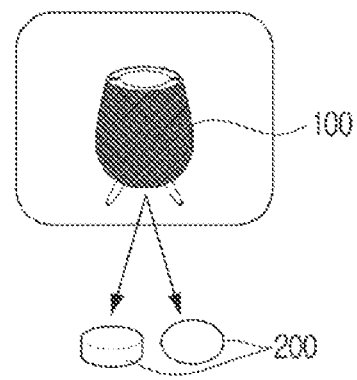
FIG. 12 is a diagram illustrating an electronic apparatus according to an embodiment of the disclosure.
Figure 14:
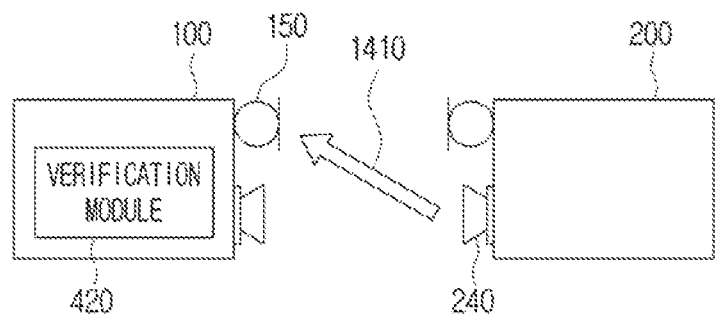
FIG. 14 is a diagram illustrating an edge device according to an embodiment of the disclosure.

FIGS. 12 and 14 are diagrams for illustrating embodiments in which the electronic device of the disclosure is an edge device. Specifically, FIGS. 12 and 14 illustrate embodiments in which an ambient device (ambience dot) of an electronic apparatus, but not an electronic apparatus, provides a voice signal to a user. That is, the speaker 140 illustrated in FIGS. 4, 6 and 7 is not provided on the electronic apparatus 100, but is implemented as an external speaker device. Meanwhile, in the disclosure, an ambient device means an apparatus separate from an electronic apparatus, and in this specification, an ambient device may be referred to as an external device, etc.

Referring to FIG. 12, the electronic apparatus 100, which is implemented as an edge device, may transmit a voice signal to at least one ambient device 200 connected through a network. Here, the electronic apparatus 100 and the ambient device 200 may be connected through a wireless network or a wired network. In FIG. 12, it is illustrated that the electronic apparatus 100 is an artificial intelligence speaker, but the types of the electronic apparatus 100 are not limited thereto, and the electronic apparatus 100 may be a mobile device, a TV, a server, etc.

Figure 13:
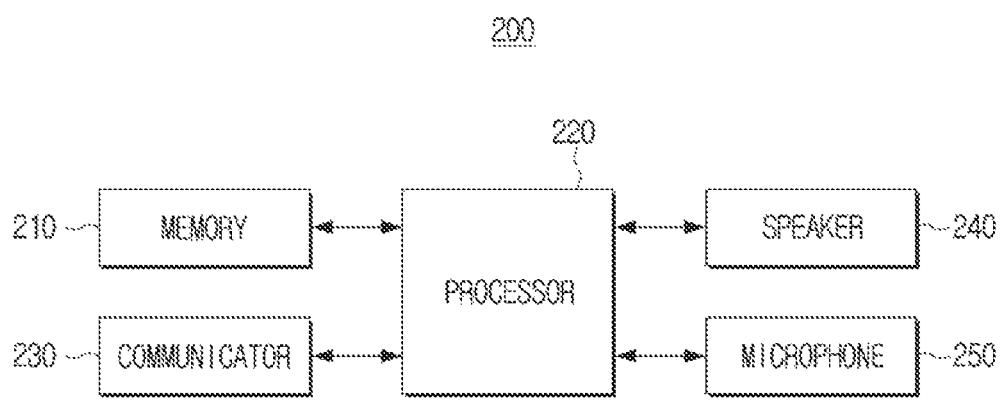
FIG. 13 is a block diagram illustrating a detailed configuration of ambient devices in FIG. 12.

Here, the ambient device 200 may include the components as illustrated in FIG. 13.

Referring to FIG. 13, the ambient device 200 may include a memory 210, a processor 220, a communicator 230, a speaker 240, and a microphone 250.

The memory 210 may store various programs and data necessary for the operation of the ambient device 200. Specifically, the memory 210 may store software programs or applications including computer-readable instructions for providing at least one instruction to the processor 220. The processor 220 may control the ambient device 200 to perform the aforementioned operation by executing the software stored in the memory 210. The memory 210 may be implemented as a non-volatile memory, a volatile memory, a flash-memory, a hard disc drive (HDD) or a solid state drive (SSD), etc. Further, the memory 210 may be accessed by the processor 220, and reading/recording/correcting/deleting/updating, etc. of data by the processor 220 may be performed. Meanwhile, in the disclosure, the term memory may include a memory 210, a ROM inside the processor 220, a RAM, or a memory card (e.g., a micro SD card, a memory stick) installed on the ambient device 200.

The processor 220 may be electronically connected with the memory 210 and control the overall operations of the ambient device 200. Specifically, the processor 220 may execute at least one instruction of software programs or applications stored in the memory 210 and control the ambient device 200 to perform functions described in the disclosure.

According to an embodiment of the disclosure, the processor 220 may be implemented as a digital signal processor (DSP), a microprocessor, and a time controller (TCON). However, the disclosure is not limited thereto, and the processor 220 may include one or more of a central processing unit (CPU), a micro controller unit (MCU), a micro processing unit (MPU), a controller, an application processor (AP) or a communication processor (CP), and an ARM processor, or may be defined by the terms. Also, the processor 220 may be implemented as a system on chip (SoC) having a processing algorithm stored therein or large scale integration (LSI), or in the form of a field programmable gate array (FPGA).

The communicator 230 is a component performing communication with various types of other apparatuses according to various types of communication methods. Here, another apparatus communicating with the ambient device 200 may be a server or the electronic apparatus 100 which is a user terminal apparatus.

Communicative connection of the communicator 230 with an external apparatus may include communication via a third apparatus (e.g., a repeater, a hub, an access point, a server, or a gateway, etc.). The communicator may be implemented as a wireless communication interface for performing wireless communication, which may include cellular communication using at least one of LTE, LTE Advance (LTE-A), code division multiple access (CDMA), wideband CDMA (WCDMA), a universal mobile telecommunications system (UMTS), Wireless Broadband (WiBro), or a Global System for Mobile Communications (GSM). According to an embodiment, wireless communication may include, for example, at least one of wireless fidelity (WiFi), Bluetooth, Bluetooth low energy (BLE), Zigbee, near field communication (NFC), Magnetic Secure Transmission, radio frequency (RF), or a body area network (BAN). The communicator may also be implemented as wired communication, such as an optical or Ethernet network interface controller (NIC), which may include, for example, at least one of a universal serial bus (USB), a high definition multimedia interface (HDMI), a recommended standard 232 (RS-232), power line communication, or a plain old telephone service (POTS). Networks over which wireless communication or wired communication is performed may include at least one of a telecommunication network, for example, a computer network (e.g.: an LAN or a WAN), the Internet, or a telephone network.

The processor 220 may receive a voice signal from the electronic apparatus through the communicator 230. Then, the processor 220 may output the voice signal received from the electronic apparatus through the speaker 240.

The speaker 240 is a component outputting various kinds of audible notification sounds or voice messages as well as various types of audio data for which various processing operations such as decoding or amplification, noise filtering, etc. were performed by the processor 220. In particular, the speaker 240 may output a voice signal in the form of a voice waveform as a sound in the form of a natural language. Here, a voice output may correspond to pre-stored text data such as an electronic book, or may be a response to a user inquiry output as a voice message in the form of a natural language. Meanwhile, a component for outputting audio may be implemented as a speaker, but the speaker is merely an example, and the component may be implemented as an output terminal that can output audio data.

The microphone 250 is a component for receiving input of a user voice uttered. The microphone 250 may generate (or, convert) a speech or a sound received from the an audio source into an electronic signal by the control of the processor 220. The electronic signal generated at the microphone 250 may be converted by control of the processor 220 and stored in the memory 210.

Here, the voice input through the microphone 250 may be a voice directly uttered by a user, or a voice output through the speaker 240 provided on an ambient device 200, or a voice output by a speaker provided on another apparatus.

Meanwhile, the processor 220 may transmit the voice signal input through the microphone 250 to the electronic apparatus 100 through the communicator 230. Here, the electronic apparatus 100 may verify the voice signal received from the ambient device 200 and detect an error operation of the TTS module. Afterwards, when the corrected voice signal is received through the communicator 230, the processor 220 may output the corrected voice signal through the speaker 240. Here, the processor 220 may output an indicator indicating that the output voice was corrected. Here, an indicator may be received from the electronic apparatus 100, or the indicator may have been stored in the ambient device 200.

Meanwhile, in FIG. 13, it is illustrated that the ambient device 200 includes both the speaker 240 and the microphone 250, but depending on embodiments, the ambient device 200 may include only one of the speaker 240 or the microphone 250, and may further include a display.

Meanwhile, the electronic apparatus 100 may include a verification module 420 as illustrated in FIG. 14.

According to an embodiment of the disclosure, the electronic apparatus 100 may input the input data into the TTS module and acquire a voice signal. Then, the electronic apparatus 100 may transmit the acquired voice signal to the ambient device 200 including the speaker 240. Here, the ambient device 200 may output the voice signal acquired from the electronic apparatus 100.

Here, the electronic apparatus 100 may receive the voice signal 1410 output at the speaker 240 of the ambient device 200 through the microphone 150. Then, the electronic apparatus 100 may compare the voice signal received through the microphone 150 and the input data input into the TTS module by using the verification module 420 and detect an error in the voice signal acquired by the TTS module.

If an error is detected, the electronic apparatus 100 may correct the input data, and input the corrected input data into the TTS module and acquire a corrected voice signal. Then, the electronic apparatus 100 may transmit the acquired corrected voice signal to the ambient device 200, and control the corrected voice signal to be output at the ambient device 200 through the speaker 240.

Meanwhile, regarding FIG. 14, it was described that the voice signal output at the speaker 240 of the ambient device 200 is received by the microphone 150 of the electronic apparatus 100, but the disclosure is not limited thereto, and the voice signal output at the speaker 240 of the ambient device 200 may be received by the microphone of the ambient device 200. In this case, the voice signal received through the microphone of the ambient device 200 may be transmitted to the electronic apparatus 100, and the electronic apparatus 100 may detect an error in the received voice signal. As another example, the voice signal output at the speaker of the electronic apparatus 100 may be received by the microphone of the ambient device 200. In this case, the voice signal received through the microphone of the ambient device 200 may be transmitted to the electronic apparatus 100, and the electronic apparatus 100 may detect an error in the received voice signal. That is, depending on embodiments, the ambient device 200 may include only the speaker 240, or only the microphone, or both the speaker and the microphone.

Figure 16:
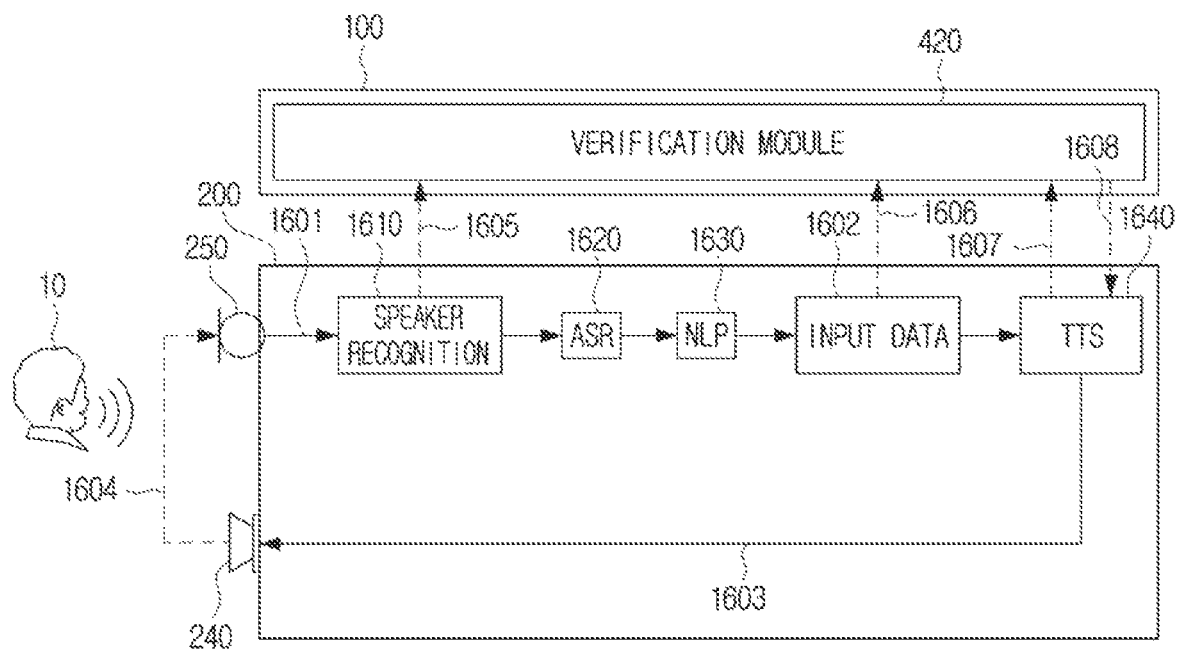
FIG. 16 is a diagram illustrating operations of the electronic apparatus in FIG. 12 according to an embodiment of the disclosure.

FIGS. 15 and 16 are diagrams for illustrating operations of the electronic apparatus in FIG. 12. Here, the electronic apparatus 100 may be a terminal apparatus, or a server.

Referring to FIG. 15, the electronic apparatus 100 may be a server having an excellent computing performance.

Referring to FIG. 15, the electronic apparatus 100 may receive as input a voice signal 1501 from an external apparatus 200, and recognize an identify of the speaker of the received voice signal using speaker recognition 1502. Here, the voice signal received from the external apparatus 200 may be a voice signal uttered by a user 10 received by a microphone 250 provided on the external apparatus 200. Meanwhile, in FIG. 15, it is illustrated that the microphone 250 is provided on the ambient device 200, but in case the ambient device 200 is an edge device, the electronic apparatus 100 may receive the voice signal 1501 through the microphone provided on another second ambient device (e.g., ambience dot) connected with the ambient device 200. Here, the voice signal received through the microphone provided on the second ambient device may be transmitted to the electronic apparatus 100 from the second ambient device through the ambient device 200, or transmitted directly to the electronic apparatus 100 from the second ambient device.

Then, the electronic apparatus 100 may differently process the received voice signal depending on the result of speaker recognition. If, as a result of speaker recognition, it is determined that the speaker of the received voice signal is the user, the electronic apparatus 100 may provide as input 1503 the received voice signal into the automatic speech recognition (ASR) module 510. Then, the electronic apparatus 100 may acquire input data 40 to be input into the TTS module 410 by using the speech recognition (ASR) module 510 and the natural language processing (NLP) module 520. Meanwhile, the electronic apparatus 100 may identify the speaker based on the result of speaker recognition, and acquire input data 40 based on the result of speaker recognition. Then, the electronic apparatus 100 may provide as input 1504 the acquired input data 40 into the TTS module 410.

As the operations in each module are similar to the operations in FIGS. 4 to 7, redundant explanations thereof will be omitted.

Meanwhile, the electronic apparatus 100 may transmit the voice signal 1505 for the input data output at the TTS module 410 to the external apparatus 200. Then, the external apparatus 200 that received the voice signal may output the received voice signal through the speaker 240. Next, the voice signal output through the speaker 240 of the external apparatus 200 may be received 1507 through the microphone 250 of the external apparatus 200. Here, depending on embodiments, the electronic apparatus 100 may provide as input 1506 the voice signal output at the TTS module 410 into the verification module 420.

Meanwhile, the electronic apparatus 100 may receive the voice signal 1501 through the microphone 250 of the external apparatus 200.

Meanwhile, regarding FIG. 15, it was described that the voice signal output through the speaker 240 provided on the external apparatus 200 is received through the microphone 250 provided on the external apparatus 200. However, in case the ambient device 200 is an edge device, the ambient device 200 may transmit the voice signal to the second ambient device connected with the ambient device 200, and the voice signal may be output through the speaker provided on the second ambient device, the voice signal output through the microphone provided on the second ambient device may be input, and the ambient device 200 may receive the voice signal input from the second ambient device and transmit the signal to the electronic apparatus 100. Meanwhile, depending on embodiments, the voice signal output at the speaker of the second ambient device may be received at the microphone 250 of the ambient device 200 and transmitted to the electronic apparatus 100, and the voice signal output at the speaker 240 of the ambient device 200 may be directly received by the microphone of the second ambient device and the microphone may transmit the signal to the electronic apparatus 100, or transmit the signal to the electronic apparatus 100 through the ambient device 200.

Also, the electronic apparatus 100 may recognize 1502 the speaker for identifying whether the received voice signal 1501 is the voice signal uttered by the user or the voice signal output at the speaker 240. If it is determined that the speaker of the received voice signal is the user, the electronic apparatus 100 may provide as input 1503 the received voice into the speech recognition (ASR) module 510, for performing a general voice recognition operation.

Meanwhile, if it is determined that the voice signal received from the external apparatus 200 was output at the TTS module 410, the electronic apparatus 100 may provide as input 1508 the received voice signal into the verification module 420. The verification module 420 may include at least one of a verification module using a text, a verification module using a frequency characteristic, or a verification module using the length of the sentence, as illustrated in FIGS. 8, 9 and 11. Specifically, the electronic apparatus 100 may provide as input 1509 the input data 40 input into the TTS module 410 into the verification module 420, and the verification module 420 may compare the input data 40 and the input voice signal 1508, and detect an error in the voice signal.

Meanwhile, a speaker recognition 1502 operation may be optional, and depending on embodiments, the electronic apparatus 100 may input a voice signal 1501, which was received from the external apparatus 200 within a predetermined time period after the voice signal output from the TTS module 410 was transmitted as input 1505 to the external apparatus 200, into the verification module 420 directly, without a speaker recognition 1502 operation.

Then, based on the verification result, if there is no error in the voice signal, the electronic apparatus 100 may continue outputting of the voice signal and complete outputting of the voice. Meanwhile, if there is an error in the voice signal, the electronic apparatus 100 may correct the input data 40 output at the natural language processing module 520, and provide as input 1510 the corrected input data into the TTS module 410. Then, the electronic apparatus 100 may transmit 1505 the corrected voice signal acquired through the TTS module 410 to the external apparatus 200 again. Here, the electronic apparatus 100 may also transmit an indicator indicating that the voice signal was corrected.

Meanwhile, regarding FIG. 15, it was described that the electronic apparatus 100 performs all the functions of the speech recognition (ASR) module 510, the natural language processing (NLP) module 520, the TTS module 410, and the speaker recognition module 1502. However, the disclosure is not limited thereto, and at least some functions may be performed by the external apparatus 200, as illustrated in FIG. 16. This is because the processing burden of the electronic apparatus 100 can be reduced, as some functions are performed through the external apparatus 200 having an excellent computing performance, since the data processing amount is excessive as at least some components of the electronic apparatus 100 use an artificial intelligence module.

Meanwhile, regarding FIG. 16, it was described that the functions of the speaker recognition module 1410, the automatic speech recognition (ASR) module 1420, the natural language processing (NLP) module 1430, and the TTS module 1440 other than the verification module 420 are performed at the external apparatus 200. However, the disclosure is not limited thereto, and at least some of the functions of the speaker recognition module 1410, the automatic speech recognition (ASR) module 1420, the natural language processing (NLP) module 1430, and the TTS module 1440 may be performed at the electronic apparatus 100.

Referring to FIG. 16, the external apparatus 200 may receive input of the voice uttered by the user 10 through the microphone 250 provided. Meanwhile, regarding FIG. 16, it was described that the microphone 250 is provided on the ambient device 200. However, in case the ambient device 200 is an edge device, the electronic apparatus 100 may receive the voice signal received through the microphone provided on another second ambient device (e.g., ambience dot) connected with the ambient device 200. Here, the voice signal received through the microphone provided on the second ambient device may be transmitted to the electronic apparatus 100 from the second ambient device through the ambient device 200.

Then, the received voice signal may be provided as input 1601 into the speaker recognition module 1610. Here, the external apparatus 200 may differently process the received voice signal depending on the result of speaker recognition. If, as a result of speaker recognition, it is determined that the speaker of the received voice signal is the user, the external apparatus 200 may input the input voice signal into the automatic speech recognition (ASR) module 1620. Then, the external apparatus 200 may acquire response information for the user voice as the input data 1602 to be input into the TTS module 1640 by using the speech recognition (ASR) module 1620 and the natural language processing (NLP) module 1630. Meanwhile, the external apparatus 200 may input the acquired input data 1602 into the TTS module 1640. Then, depending on embodiments, the external apparatus 200 may transmit as input 1606 the input data 1602 output at the natural language processing module 1630 to the verification module 420 of the electronic apparatus 100.

Here, the operation at each module of the external apparatus 200 is similar to the operation at each module of the electronic apparatus described in FIGS. 4 to 7. Thus, redundant explanations will be omitted.

Meanwhile, the external apparatus 200 may output the voice signal for the input data 1602 output at the TTS module 1640 through the speaker 240. Then, the voice signal output through the speaker 240 of the external apparatus 200 may be provided as input 1604 through the microphone 250 of the external apparatus 200.

Meanwhile, in FIG. 16, it was described that the voice signal output through the speaker 240 provided on the external apparatus 200 is received through the microphone 250 provided on the external apparatus 200. However, in case the ambient device 200 is an edge device, the ambient device 200 may transmit the voice signal to a second ambient device connected to the ambient device 200, and the voice signal may be output through the speaker provided on the second ambient device, the voice signal output through the microphone provided on the second ambient device may be input, and the ambient device 200 may receive the voice signal input from the second ambient device and transmit the signal to the electronic apparatus 100. Meanwhile, depending on embodiments, the voice signal output at the speaker of the second ambient device may be received at the microphone 250 of the ambient device 200 and transmitted to the electronic apparatus 100, or the voice signal output at the speaker 240 of the ambient device 200 may be received by the microphone of the second ambient device, and the microphone may directly transmit the signal to the electronic apparatus 100, or transmit the signal to the electronic apparatus 100 through the ambient device 200.

Here, depending on embodiments, the external apparatus 200 may transmit the voice signal 1607 output at the TTS module 1640 to the verification module 420 of the electronic apparatus 100. In this case, the verification module 420 of the electronic apparatus 100 may compare the input data 1606 received from the external apparatus 200 and the voice signal 1607 received from the external apparatus 200 and detect an error in the voice signal. The verification module 420 of the electronic apparatus 100 may include at least one of a verification module using a text, a verification module using a frequency characteristic, or a verification module using the length of the sentence, as illustrated in FIGS. 8, 9 and 11.

Meanwhile, depending on embodiments, the identity of the speaker may be recognized 1610 for identifying whether the voice signal 1601 received through the external apparatus 200 is a voice signal for the voice uttered by the user 10 or the voice signal output at the speaker 240. If it is determined that the speaker of the voice signal received through the microphone 250 is the user 10, the external apparatus 200 may input the received voice into the speech recognition (ASR) module 1620, for performing a general voice recognition operation.

Meanwhile, if it is determined that the voice signal received through the microphone 250 was output through the speaker 240, the external apparatus 200 may transmit as input 1605 the received voice signal to the verification module 420 of the electronic apparatus 100. Specifically, the electronic apparatus 100 may compare the input data 1606 received from the external apparatus 200 and the voice signal 1605 received from the external apparatus 200 and detect an error in the voice signal.

Meanwhile, a speaker recognition 1610 operation is an optional one, and depending on embodiments, the external apparatus 200 may directly transmit a voice signal, which was received through the microphone 250 within a predetermined time period after the voice signal was output through the speaker 240, to the verification module 420 of the electronic apparatus 100, without a speaker recognition 1610 operation.

Then, based on the verification result, if there is no error in the voice signal, the electronic apparatus 100 may transmit a feedback signal indicating that there is no separate feedback, or there is no error to the external apparatus 200. Meanwhile, if there is an error in the voice signal, the electronic apparatus 100 may correct input data received from the external apparatus 200, and provide as input 1608 the corrected input data into the TTS module 1640 of the external apparatus 200. Then, the external apparatus 200 may again provide as output 1603 the corrected voice signal acquired through the TTS module 1640 through the speaker 240. Here, the external apparatus 200 may also output an indicator indicating that the voice signal was corrected.

Meanwhile, regarding FIG. 16, it was described that the input data 1602 is response information for the voice of the user 10, but in actual implementation, the input data may be pre-stored data like an electronic book, or data received from an external server, etc.

Figure 17:
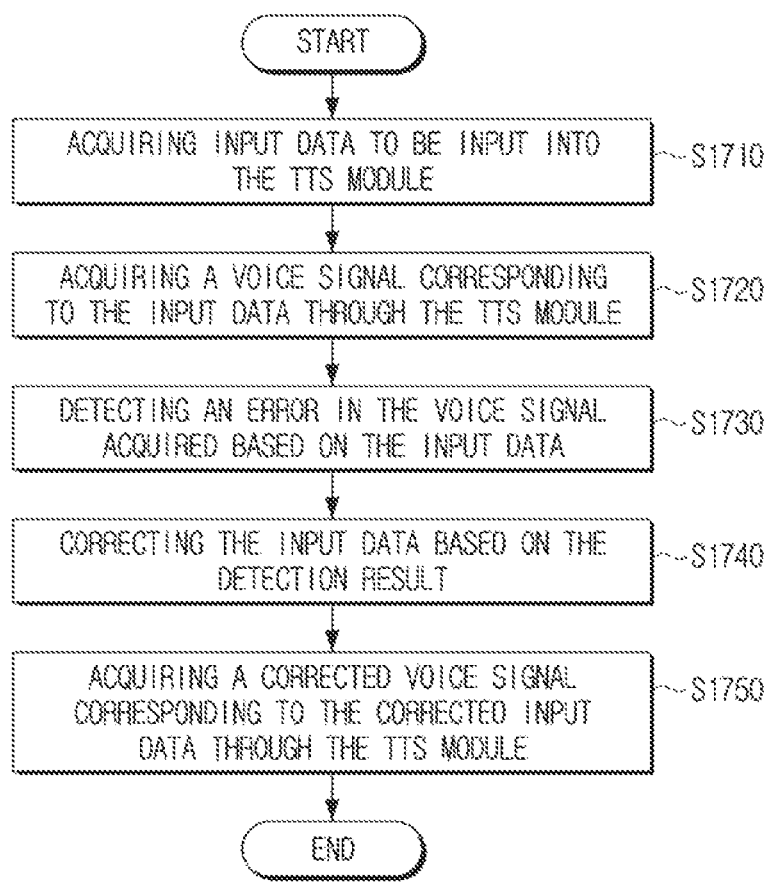
FIG. 17 is a flow chart illustrating a method of controlling an electronic apparatus according to an embodiment of the disclosure.

FIG. 17 is a flow chart illustrating a method of controlling an electronic apparatus according to an embodiment of the disclosure.

Referring to FIG. 17, first, the electronic apparatus may acquire input data to be input into the TTS module at operation S1710. Here, input data may be text data and data related to emotions. Also, input data may be pre-stored data, or data received from an external apparatus, or response information acquired by analyzing a user voice.

Then, the electronic apparatus may acquire a voice signal corresponding to the input data through the TTS module at operation S1720. Specifically, the electronic apparatus may input the input data into the TTS module, and acquire a voice signal corresponding to the input data. Here, the response voice signal output at the TTS module may be output directly by the speaker provided on the electronic apparatus, or the response voice signal may not be output directly.

Then, the electronic apparatus may detect an error in the voice signal acquired based on the input data at operation S1730. Specifically, the electronic apparatus may compare the voice signal output from the TTS module and the input data input into the TTS module, and detect an error in the voice signal. Specifically, the electronic apparatus may detect an error in the output voice signal through text comparison, frequency characteristic comparison, sentence length comparison, etc. included in the output voice signal and the input data.

Then, if an error in the output voice signal is detected, the electronic apparatus may correct the input data at operation S1740. Specifically, the electronic apparatus may correct the input data by changing the spacing of the text included in the input data, changing the punctuation mark, or applying a markup language, e.g., an SSML. Alternatively, depending on embodiments, the electronic apparatus may correct the filter value of output hardware, or correct the speaker characteristic.

Also, the electronic apparatus may output a corrected voice signal corresponding to the corrected input data at operation S1750. Specifically, the electronic apparatus may input the corrected input data into the TTS module again and output a corrected voice signal.

Here, the electronic apparatus may perform re-verification by inputting the corrected voice signal into the verification module again, or provide the signal to the user through the speaker. In case the voice signal is provided to the user through the speaker, the electronic apparatus may also output an indicator indicating that the voice signal was corrected.

Figure 18:
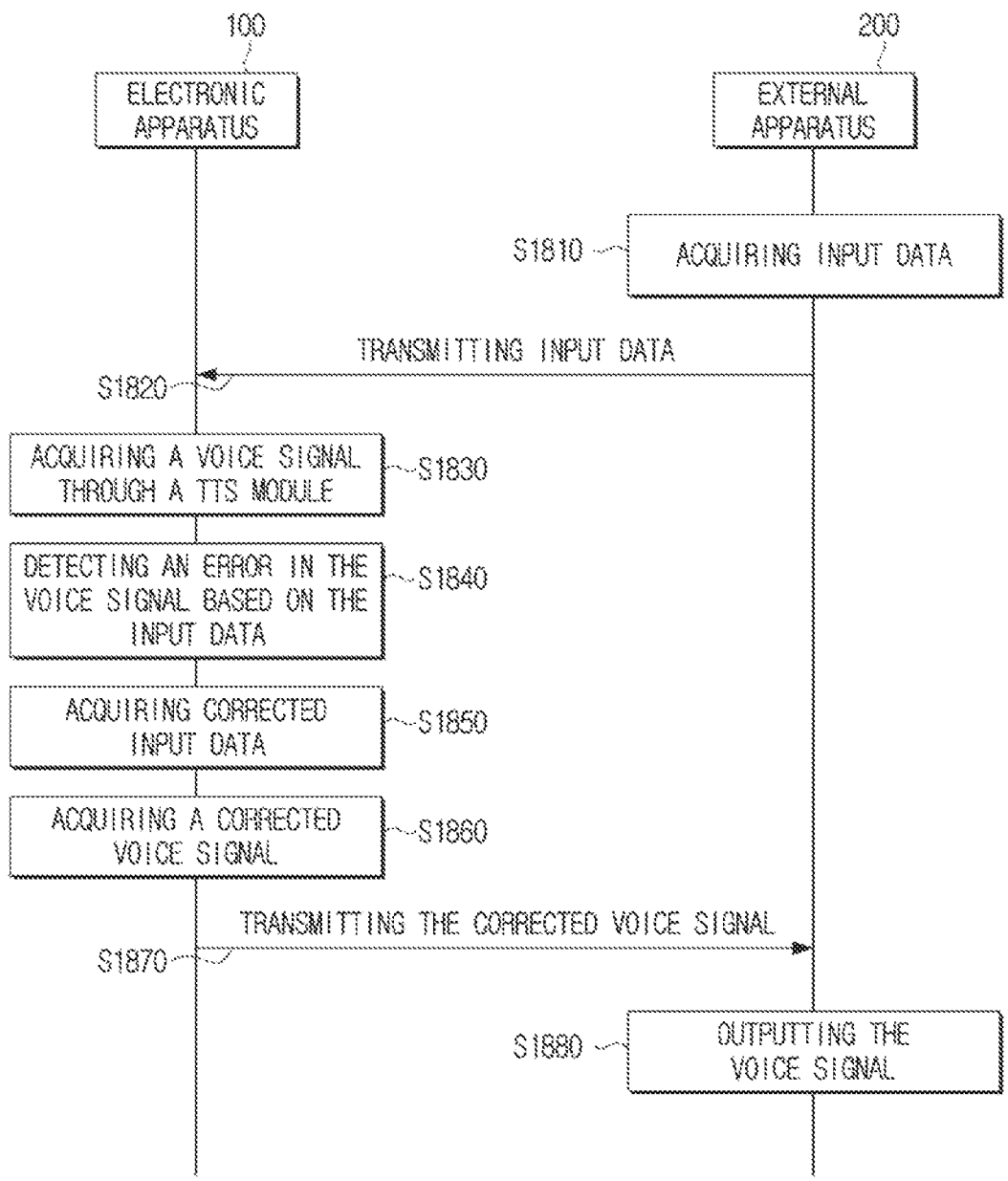
FIG. 18 is a sequence diagram illustrating operations of the electronic apparatus and the external apparatus in FIG. 15.

FIG. 18 is a sequence diagram illustrating operations of the electronic apparatus and the external apparatus in FIG. 15. Here, the electronic apparatus 100 may be a terminal apparatus or a server. FIG. 18 is illustrated according to an embodiment in which only a TTS module and a verification module are included. However, the disclosure is not limited thereto.

Referring to FIG. 18, the external apparatus 200 may acquire input data at operation S1810. Here, the input data may be data input into the TTS module for outputting a voice through the TTS module. Specifically, the input data may include text data stored in advance like an electronic book or received from an external apparatus or response text data acquired by analyzing a user voice. Here, input data may further include data related to the emotion corresponding to the text data.

In particular, in case the input data is response data corresponding to a user voice, the external apparatus 200 may include an automatic speech recognition (ASR) module, a natural language processing (NLP) module, etc., and the external apparatus 200 may acquire response data corresponding to a user voice through a separate voice recognition server.

Then, the external apparatus 200 may transmit the acquired input data to the electronic apparatus 100 at operation S1820.

Next, the electronic apparatus 100 may acquire a voice signal corresponding to the input data received from the external apparatus 200 through the TTS module at operation S1830.

Then, the electronic apparatus 100 may detect an error in the voice signal based on the input data at operation S1840. Specifically, the electronic apparatus 100 may detect an error in the output voice signal through text comparison, frequency characteristic comparison, sentence length comparison, etc. included in the voice signal output from the TTS module and the input data.

If an error is detected in the voice signal, the electronic apparatus 100 may acquire corrected input data at operation S1850. Specifically, the electronic apparatus 100 may correct the input data by changing the spacing of the text included in the input data, changing the punctuation mark, or applying a markup language, e.g., an SSML. Alternatively, depending on embodiments, the electronic apparatus 100 may correct the filter value of output hardware, or correct the speaker characteristic.

Then, the electronic apparatus 100 may output a corrected voice signal corresponding to the corrected input data at operation S1860. Specifically, the electronic apparatus 100 may input the corrected input data into the TTS module again and acquire a corrected voice signal.

Next, the electronic apparatus 100 may transmit the corrected voice signal to the external apparatus 200 at operation 1870. Here, the electronic apparatus 100 may also transmit an indicator indicating that the voice signal was corrected. Meanwhile, the electronic apparatus 100 may input the corrected voice signal into the verification module again and perform re-verification.

Then, the external apparatus 200 may output the corrected voice signal received from the electronic apparatus 100 at operation S1880. Specifically, the external apparatus 200 may output the received voice signal through the speaker. Meanwhile, in case the external apparatus 200 received an indicator from the electronic apparatus 100, the external apparatus 200 may output the indicator first before outputting the corrected voice signal.

Figure 19:
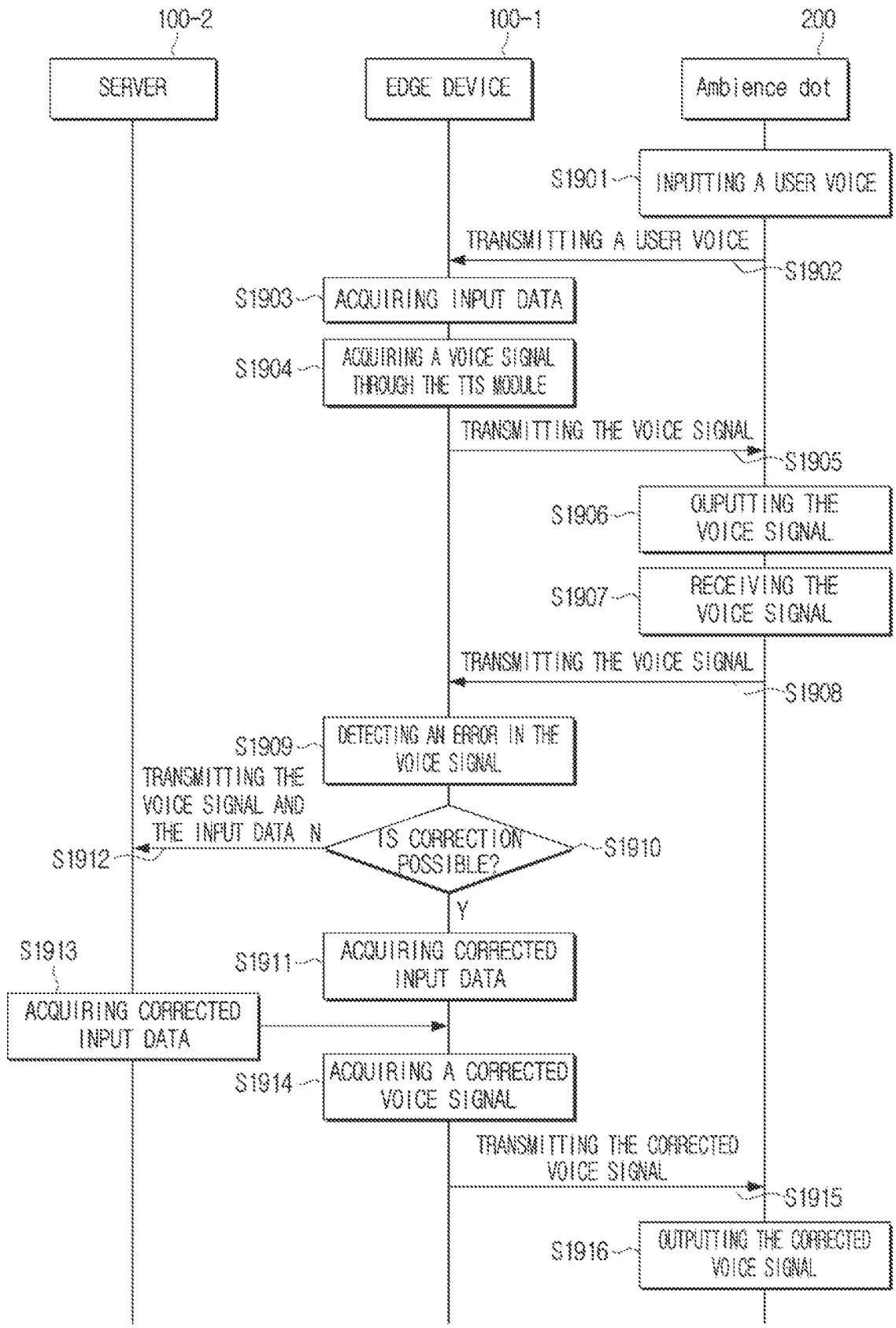
FIG. 19 is a sequence diagram illustrating a verification of a TTS module performed by a server and an edge device in a conversation system including a server, an edge device, and an ambience dot.

FIG. 19 is a sequence diagram illustrating a verification of a TTS module performed by a server and an edge device in a conversation system including a server, an edge device, and an ambience dot.

Referring to FIG. 19, the ambience dot 200 may receive input of a user voice through the microphone provided at operation S1901. Then, the ambience dot 200 may transmit the input user voice to the edge device 100-1 at operation S1902.

Next, the edge device 100-1 may acquire input data based on a user voice received from the ambience dot 200 at operation S1903. Specifically, the edge device 100-1 may acquire input data to be input into the TTS module by using the automatic speech recognition (ASR) module and a natural language processing (NLP) module to the received voice signal.

Then, the edge device 100-1 may acquire a voice signal corresponding to the input data through the TTS module at operation S1904. Meanwhile, regarding FIG. 19, it is described that an ASR module, an NLP module, and a TTS module are provided on the edge device 100-1. However, in actual implementation, the function of at least one module among the ASR module, the NLP module, and the TTS module may be performed by the server 100-2.

Next, the edge device 100-1 may transmit the voice signal output from the TTS module to the ambience dot 200 at operation S1905. In case the TTS module is provided on the server 100-2, the server 100-2 may transmit the voice signal output at the TTS module to the edge device 100-1 or the ambience dot 200.

Then, the ambience dot 200 that received the voice signal may output the received voice signal through the speaker provided at operation S1906. Next, the ambience dot 200 may receive the voice signal output at the speaker through the microphone at operation S1907. Meanwhile, regarding FIG. 19, it was described that a voice signal is output and received through the speaker and the microphone provided on the ambience dot 200. However, depending on embodiments, a voice signal may be output through the speaker provided on the edge device 100-1, or a voice signal may be received through the microphone provided on the ambience dot 200, or a voice signal may be output through the speaker provided on the ambience dot 200, or a voice signal may be received through the microphone provided on the edge device 100-1.

Meanwhile, in case a voice signal was received through the ambience dot 200, the ambience dot 200 may transmit the received voice signal to the edge device 100-1 at operation S1908. Here, the edge device 100-1 may detect an error in the voice signal at operation S1909. Specifically, the edge device 100-1 may compare the input data and the voice signal output at the TTS module and detect an error in the voice signal.

Then, if an error in the voice signal is detected, the edge device 100-1 may determine that the voice signal can be corrected at the edge device 100-1 at operation S1910. For example, in case relatively simple correction such as change of the spacing, punctuation mark, etc. of the text is needed, the edge device 100-1 may determine that correction is possible at operation S1910-Y. Then, the edge device 100-1 may acquire corrected input data at operation S1911.

Meanwhile, if the frequency characteristic of the voice signal is analyzed and relatively complex correction such as applying an SSML, or changing the weight of the style token is needed, the edge device 100-1 may determine that correction is unavailable to be performed by itself at operation S1910-N. In this case, the edge device 100-1 may transmit the voice signal and the input data to the server 100-2 at operation S1912.

Then, the server 100-2 may acquire corrected input data by applying an SSML to the input data or changing the weight of the style token at operation S1913.

Here, if the function of the TTS module is performed at the edge device 100-1, the edge device 100-1 may acquire a corrected voice signal for the corrected input data by using the TTS module at operation S1914. Here, the corrected input data may be acquired at the edge device 100-1, or received from the server 100-2.

Then, the edge device 100-1 may transmit the acquired corrected voice signal to the ambience dot 200 at operation S1915, and the ambience dot 200 that received the corrected voice signal may output the corrected voice signal through the speaker at operation S1916.

According to the various embodiments described above, by detecting and correcting an error in a response voice signal output at the TTS module by using information on a response voice input into the TTS module, there is an effect that implementation of a more precise conversation system becomes possible.

Meanwhile, the various embodiments described above may be implemented in a non-transitory recording medium that can be read by a computer or an apparatus similar to a computer, by using software, hardware, or a combination thereof. According to implementation by hardware, the embodiments described in the disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors or an electronic unit for performing various functions. In some cases, the embodiments described in this specification may be implemented as a processor itself. Meanwhile, according to implementation by software, the embodiments such as procedures and functions described in this specification may be implemented as one or more separate software modules. Each of the software modules may perform one or more functions and operations described in this specification.

Meanwhile, methods according to the aforementioned various embodiments of the disclosure may be stored in a non-transitory readable medium. Such a non-transitory readable medium may be used while being integrated within various apparatuses.

A non-transitory computer-readable medium refers to a medium that stores data semi-permanently, and is readable by machines, but not a medium that stores data for a short moment such as a register, a cache, and a memory. Specifically, programs for performing the aforementioned various methods may be provided while being stored in a non-transitory readable medium such as a CD, a DVD, a hard disc, a blue-ray disc, a USB, a memory card, a ROM and the like.

Also, according to an embodiment of the disclosure, methods according to the various embodiments described in the disclosure may be provided while being included in a computer program product. A computer program product refers to a product traded between a seller and a buyer. A computer program product can be distributed on-line in the form of a storage medium that is readable by machines (e.g.: a compact disc read only memory (CD-ROM)), or through an application store (e.g.: Play store™). In the case of on-line distribution, at least a portion of a computer program product may be stored in a storage medium such as the server of the manufacturer, the server of the application store, and the memory of the relay server at least temporarily, or may be generated temporarily.

While embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
at least one processor; and
a memory configured to store at least one instruction which, when executed by the at least one processor, causes the electronic apparatus to:
acquire input data to be input into a text-to-speech (TTS) module for outputting a voice through the TTS module,
acquire a voice signal corresponding to the input data through the TTS module,
identify, by the at least one processor, a change in a frequency characteristic of the voice signal,
detect, by the at least one processor, an error in the voice signal based on the identified change in the frequency characteristic of the voice signal,
correct the input data based on a result of detecting the error, and
acquire a corrected voice signal corresponding to the input data corrected based on the result of detecting the error through the TTS module.

2. The electronic apparatus of claim 1, wherein the at least one instruction further causes the electronic apparatus to:
based on the change in the frequency characteristic of the voice signal, identify, by the at least one processor, a change in a frequency, amplitude, and cycle of the voice signal,
based on the identified change in the frequency, amplitude, and cycle of the voice signal, identify, by the at least one processor, a change of a pitch of the voice, and
based on the identified change of the pitch of the voice, detect, by the at least one processor, the error in the voice signal.

3. The electronic apparatus of claim 2, wherein the at least one instruction further causes the electronic apparatus to:
based on the identified change of the pitch of the voice, identify, by the at least one processor, at least one of an emotion, a voice tone, a style, and a prosody, and
based on the identified at least one of the emotion, the voice tone, the style, and the prosody, detect, by the at least one processor, an error in the voice signal.

4. The electronic apparatus of claim 1, wherein the at least one instruction further causes the electronic apparatus to:
based on the detection of the error in the voice signal, adjust, by the at least one processor, a frequency pitch of the voice signal, and
correct the input data based on the adjusted frequency pitch of the voice signal.

5. The electronic apparatus of claim 1, wherein the input data comprises first text data, and
wherein the at least one instruction further causes the electronic apparatus to:
convert the voice signal into second text data,
compare the first text data included in the input data and the second text data, and
detect the error in the voice signal based on a result of comparing the first text data and the second text data.

6. The electronic apparatus of claim 1, wherein the at least one instruction further causes the electronic apparatus to:
compare a length of the voice signal and a length of text data included in the input data, and
detect the error in the voice signal based on a result of comparing the length of the voice signal and the length of the text data included in the input data.

7. The electronic apparatus of claim 1, wherein the at least one instruction further causes the electronic apparatus to:

based on detecting the error in the voice signal, correct at least one of a spacing or a punctuation mark of text data included in information on the input data, and input corrected input data having the at least one of the spacing or the punctuation mark of the text data into the TTS module.

8. The electronic apparatus of claim 1, wherein the at least one instruction further causes the electronic apparatus to:

based on detecting the error in the voice signal, correct the input data by applying a speech synthesis markup language (SSML) to text data included in the input data, and input corrected input data having the speech synthesis markup language (SSML) applied to the text data into the TTS module.

9. The electronic apparatus of claim 1, wherein the at least one instruction further causes the electronic apparatus to:

convert a received user voice into text data by using a voice recognition module, analyze an intent of the text data, and acquire response information corresponding to the received user voice as the input data.

10. The electronic apparatus of claim 1, further comprising:

a speaker, wherein the at least one instruction further causes the electronic apparatus to:

add an indicator indicating correction to the voice signal, and output the voice signal having the indicator through the speaker.

11. The electronic apparatus of claim 1, further comprising:

a speaker; and a microphone, wherein the at least one instruction further causes the electronic apparatus to:

output the voice signal through the speaker, and based on the voice signal output through the speaker being received through the microphone, detect the error in the voice signal received through the microphone based on the input data.

12. The electronic apparatus of claim 11, wherein the at least one instruction further causes the electronic apparatus to:

identify an identity of the voice signal received through the microphone, based on the voice signal received through the microphone being the voice signal output through the speaker based on the identity, detect the error in the voice signal, and based on the voice signal received through the microphone having been uttered by a user based on the identity, convert the voice signal into text data by using a voice recognition module, and analyze an intent of the text data and acquire response information corresponding to the received user voice as the input data.

13. The electronic apparatus of claim 1, further comprising:

a communicator, wherein the at least one instruction further causes the electronic apparatus to transmit the voice signal to an external apparatus through the communicator.

14. A method of controlling an electronic apparatus, the method comprising:

acquiring input data to be input into a text-to-speech (TTS) module for outputting a voice through the TTS module;

acquiring a voice signal corresponding to the input data through the TTS module;

identifying, by at least one processor of the electronic apparatus, a change in a frequency characteristic of the voice signal;

detecting, by the at least one processor, an error in the voice signal based on the identified change in the frequency characteristic of the voice signal;

correcting the input data based on a result of the detecting the error; and acquiring a corrected voice signal corresponding to the input data corrected based on the result of detecting the error through the TTS module.

15. The method of claim 14, wherein the detecting the error comprises:

based on the change in the frequency characteristic of the voice signal, identifying a change in a frequency, amplitude, and cycle of the voice signal;

based on the identified change in the frequency, amplitude, and cycle of the voice signal, identifying a change of a pitch of the voice; and based on the identified change of the pitch of the voice, detecting an error in the voice signal.

16. The method of claim 15, wherein the detecting the error comprises:

based on the identified change of the pitch of the voice, identify, by the at least one processor, at least one of an emotion, a voice tone, a style, and a prosody, and based on the identified at least one of the emotion, the voice tone, the style, and the prosody, detect, by the at least one processor, an error in the voice signal.

17. The method of claim 14, wherein the correcting the input data comprises:

based on the detection of the error in the voice signal, adjusting a frequency pitch of the voice signal; and correcting the input data based on the adjusted frequency pitch of the voice signal.

18. The method of claim 14, wherein the input data comprises first text data, and wherein the detecting the error comprises:

converting the voice signal into second text data;

comparing the first text data included in the input data and the second text data; and detecting the error in the voice signal based on a result of the comparing the first text data and the second text data.

19. The method of claim 14, wherein the detecting the error comprises:

comparing a length of the voice signal and a length of text data included in the input data; and detecting the error in the voice signal based on a result of comparing the length of the voice signal and the length of the text data included in the input data.

20. The method of claim 14, wherein the correcting comprises:

based on detecting the error in the voice signal, correcting at least one of a spacing or a punctuation mark of text data included in the input data; and inputting corrected input data having the at least one of the spacing or the punctuation mark of the text data into the TTS module.

* * * * *